United States Patent
Ko et al.

(10) Patent No.: US 12,108,368 B2
(45) Date of Patent: Oct. 1, 2024

(54) METHOD FOR TRANSMITTING AND RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Hyunsoo Ko, Seoul (KR); Woosuk Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 17/635,326

(22) PCT Filed: Aug. 14, 2020

(86) PCT No.: PCT/KR2020/095112
§ 371 (c)(1),
(2) Date: Feb. 14, 2022

(87) PCT Pub. No.: WO2021/034176
PCT Pub. Date: Feb. 25, 2021

(65) Prior Publication Data
US 2022/0295464 A1 Sep. 15, 2022

(30) Foreign Application Priority Data

Aug. 16, 2019 (KR) .......................... 10-2019-0100602

(51) Int. Cl.
*H04W 72/04* (2023.01)
*H04W 56/00* (2009.01)
*H04W 72/044* (2023.01)

(52) U.S. Cl.
CPC ......... *H04W 72/044* (2013.01); *H04W 56/00* (2013.01)

(58) Field of Classification Search
CPC .......................... H04W 72/044; H04W 56/00
See application file for complete search history.

(56) References Cited

U.S. PATENT DOCUMENTS

2018/0242324 A1 8/2018 Luo
2019/0045529 A1 2/2019 Xiong et al.

FOREIGN PATENT DOCUMENTS

KR 1020190038324 A 4/2019
KR 102002807 B1 7/2019

OTHER PUBLICATIONS

Daegun Jang et al., 'Link-Level Performance Evaluation of SideLink Synchronization Signal Block for 5G V2X', 2023 Fourteenth International Conference on Ubiquitous and Future Networks (ICUFN), 2023, pp. 1-3. (Year: 2023).*
Qualcomm Incorporated, "Synchronization Design for NR V2X", 3GPP TSG RAN WG1 Meeting #97, May 13-17, 2019, R1-1907272.

* cited by examiner

*Primary Examiner* — Melvin C Marcelo
(74) *Attorney, Agent, or Firm* — BRYAN CAVE LEIGHTON PAISNER LLP

(57) ABSTRACT

Various embodiments of the present disclosure relate to a next-generation wireless communication system for supporting a higher data transmission rate than a 4G ($4^{th}$ generation) wireless communication system. According to various embodiments of the present disclosure, a method of transmitting and receiving a signal in a wireless communication system, and an apparatus for supporting same may be provided.

13 Claims, 30 Drawing Sheets

METHOD FOR TRANSMITTING AND RECEIVING SIGNAL IN WIRELESS COMMUNICATION SYSTEM, AND APPARATUS FOR SUPPORTING SAME

This application is the National Stage filing under 35 U.S.C. 371 of International Application No. PCT/KR2020/095112 filed on Aug. 14, 2020, which claims priority to Korean Patent Application No. 10-2019-0100602 filed on Aug. 16, 2019, the contents of which are all hereby incorporated by reference herein in their entirety.

TECHNICAL FIELD

Various embodiments of the present disclosure relate to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Various embodiments of the present disclosure may provide a method of transmitting and receiving a signal in a wireless communication system and an apparatus for supporting the method.

Various embodiments of the present disclosure may provide a method for a synchronization procedure in sidelink communication and an apparatus for supporting the same.

Various embodiments of the present disclosure may provide a method of transmitting and receiving information on an index of a slot in which an S-SSB is transmitted and received and an apparatus for supporting the method.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments of the present disclosure may provide a method of transmitting and receiving a signal in a wireless communication system and an apparatus for supporting the method.

Various embodiments of the present disclosure may provide a method of a user equipment (UE) in a wireless communication system.

According to an exemplary embodiment, the method may include transmitting (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, selecting a sidelink resource for transmitting a sidelink signal based on one or more preconfigured resource pools after transmitting the S-SSB, and transmitting the sidelink signal based on the sidelink resource.

According to an exemplary embodiment, the S-SSB may be transmitted in a slot included in a period including a plurality of slots for transmission of the S-SSB.

According to an exemplary embodiment, one or more most significant bits (MSB) among a plurality of bits representing a slot index of the slot may be transmitted based on the PSBCH.

According to an exemplary embodiment, one or more least significant bits (LSB) among the plurality of bits may be transmitted based on the PSBCH DM-RS.

According to an exemplary embodiment, a sequence generator for generating a sequence included in the PSBCH DM-RS may be initialized based on a sidelink-service set identifier (SL-SSID) and the LSB.

According to an exemplary embodiment, the PSBCH may be generated based on that (i) a master information block (MIB) is scrambled according to a first scrambling sequence for scrambling of the MIB and (ii) a PSBCH payload including the scrambled MIB is scrambled according to a second scrambling sequence for the PSBCH payload.

According to an exemplary embodiment, the first scrambling sequence may be initialized based on an SL-SSID at beginning of the S-SSB.

According to an exemplary embodiment, the second scrambling sequence may be initialized based on the SL-SSID at beginning of the period.

According to an exemplary embodiment, a plurality of resource elements (REs) with the PSBCH DM-RS mapped thereto may be configured with 4-comb on a frequency domain.

According to an exemplary embodiment, positions of the plurality of REs on the frequency domain may be shifted based on the SL-SSID.

According to an exemplary embodiment, an S-SSB index of the S-SSB may be equal to a remainder obtained by dividing the slot index with $L_{max}$.

According to an exemplary embodiment, the $L_{max}$ may be a maximum number of candidate S-SSBs to be transmitted by the S-SSB, determined according to subcarrier spacing (SCS).

According to an exemplary embodiment, the $L_{max}$ may be 1 based on the SCS being 15 kHz.

According to an exemplary embodiment, the $L_{max}$ may be 2 based on the SCS being 30 kHz.

According to an exemplary embodiment, the $L_{max}$ may be 4 based on the SCS being 60.

According to an exemplary embodiment, the $L_{max}$ may be 8 based on the SCS being 120 kHz.

According to an exemplary embodiment, the PSBCH may include information related to time division duplex (TDD) slot configuration (TDD slot configuration) for a position of a candidate time resource for transmitting a sidelink data channel.

Various embodiments of the present disclosure may provide an apparatus operating in a wireless communication system.

According to an exemplary embodiment, the apparatus may include a memory and one or more processors connected to the memory.

According to an exemplary embodiment, the one or more processors may transmit (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, may select a sidelink resource for transmitting a sidelink signal based on one or more preconfigured resource pools after transmitting the S-SSB, and may transmit the sidelink signal based on the sidelink resource.

According to an exemplary embodiment, the S-SSB may be transmitted in a slot included in a period including a plurality of slots for transmission of the S-SSB.

According to an exemplary embodiment, one or more most significant bits (MSB) among a plurality of bits representing a slot index of the slot may be transmitted based on the PSBCH.

According to an exemplary embodiment, one or more least significant bits (LSB) among the plurality of bits may be transmitted based on the.

According to an exemplary embodiment, a sequence generator for generating a sequence included in the PSBCH DM-RS may be initialized based on a sidelink-service set identifier (SL-SSID) and the LSB.

According to an exemplary embodiment, the PSBCH may be generated based on that (i) a master information block (MIB) is scrambled according to a first scrambling sequence for scrambling of the MIB and (ii) a PSBCH payload including the scrambled MIB is scrambled according to a second scrambling sequence for the PSBCH payload.

According to an exemplary embodiment, the apparatus may communicate with one or more of a mobile user equipment (UE), a network, and an autonomous driving vehicle other than a vehicle including the apparatus.

Various embodiments of the present disclosure may provide a method performed by a user equipment (UE) in a wireless communication system.

According to an exemplary embodiment, the method may include receiving (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, and receiving a sidelink signal included in one or more preconfigured resource pools based on a sidelink resource for receiving the sidelink signal after transmitting the S-SSB.

According to an exemplary embodiment, the S-SSB may be received in a slot included in a period including a plurality of slots for transmission of the S-SSB.

According to an exemplary embodiment, one or more most significant bits (MSB) among a plurality of bits representing a slot index of the slot may be received based on the PSBCH.

According to an exemplary embodiment, one or more least significant bits (LSB) among the plurality of bits may be received based on the PSBCH DM-RS.

Various embodiments of the present disclosure may provide an apparatus operating in a wireless communication system.

According to an exemplary embodiment, the apparatus may include a memory and one or more processors connected to the memory.

According to an exemplary embodiment, the one or more processors may receive a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, and receiving a sidelink signal included in one or more preconfigured resource pools based on a sidelink resource for receiving the sidelink signal after transmitting the S-SSB.

According to an exemplary embodiment, the S-SSB may be received in a slot included in a period including a plurality of slots for transmission of the S-SSB.

According to an exemplary embodiment, one or more most significant bits (MSB) among a plurality of bits representing a slot index of the slot may be received based on the PSBCH.

According to an exemplary embodiment, one or more least significant bits (LSB) among the plurality of bits may be received based on the PSBCH DM-RS.

Various embodiments of the present disclosure may provide an apparatus operating in a wireless communication system.

According to an exemplary embodiment, the apparatus may include one or more processors and one or more memories for storing one or more instructions for allowing the one or more processors to perform a method.

According to an exemplary embodiment, the method may include transmitting (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, selecting a sidelink resource for transmitting a sidelink signal based on one or more preconfigured resource pools after transmitting the S-SSB, and transmitting the sidelink signal based on the sidelink resource.

According to an exemplary embodiment, the S-SSB may be transmitted in a slot included in a period including a plurality of slots for transmission of the S-SSB.

According to an exemplary embodiment, one or more most significant bits (MSB) among a plurality of bits representing a slot index of the slot may be transmitted based on the PSBCH.

According to an exemplary embodiment, one or more least significant bits (LSB) among the plurality of bits may be transmitted based on the PSBCH DM-RS.

Various embodiments of the present disclosure may provide a processor-readable medium for storing one or more instructions for allowing one or more processors to perform a method.

According to an exemplary embodiment, the method may include transmitting (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, selecting a sidelink resource for transmitting a sidelink signal based on one or more preconfigured resource pools after transmitting the S-SSB, and transmitting the sidelink signal based on the sidelink resource.

According to an exemplary embodiment, the S-SSB may be transmitted in a slot included in a period including a plurality of slots for transmission of the S-SSB.

According to an exemplary embodiment, one or more most significant bits (MSB) among a plurality of bits representing a slot index of the slot may be transmitted based on the PSBCH.

According to an exemplary embodiment, one or more least significant bits (LSB) among the plurality of bits may be transmitted based on the PSBCH DM-RS.

Various embodiments as described above are only some of preferred embodiments of the various embodiments, and those skilled in the art may derive and understand many embodiments in which technical features of the various embodiments are reflected based on the following detailed description.

Advantageous Effects

Various embodiments of the present disclosure may provide a method of transmitting and receiving a signal in a wireless communication system and an apparatus for supporting the method.

Various embodiments of the present disclosure may provide a method for a synchronization procedure in sidelink communication and an apparatus for supporting the same.

Various embodiments of the present disclosure may provide a method of transmitting and receiving information on an index of a slot in which an S-SSB is transmitted and received and an apparatus for supporting the method.

According to various embodiments of the present disclosure, some bits of an index of a slot may be transmitted and received based on a PSBCH/the other bits may be transmitted and received based on a PSBCH DM-RS, and thus a payload of the PSBCH may be saved. In particular, for example, as a frequency range of a wireless communication system is increased, a bit number of bits indicating an index of a slot may be increased, and thus, particularly, in this case, various embodiments of the present disclosure may be effectively applied.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

For clarity of description, various embodiments are described in the context of a 3GPP communication system (e.g., including LTE, NR, 6G, and next-generation wireless communication systems), to which the technical spirit of the various embodiments is not limited. For the background art, terms, and abbreviations used in the description of the various embodiments, refer to the technical specifications published before the present disclosure. For example, the documents of 3GPP TS 37.213, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and so on may be referred to.

1.3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
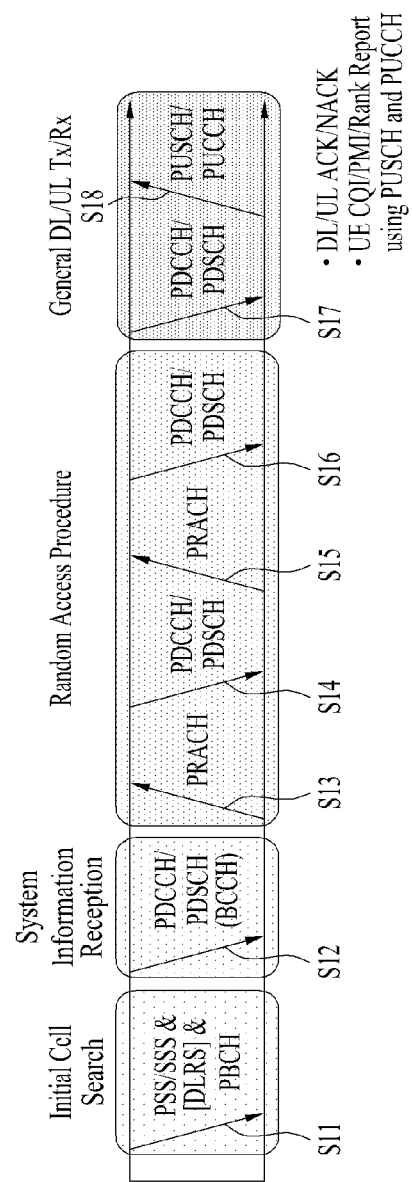
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

Then, the UE may receive a physical broadcast channel (PBCH) signal from the BS to acquire broadcast information within a cell.

The UE may receive a Downlink Reference Signal (DL RS) to check a DL channel status.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed through two steps, S13/S15 may be performed through one operation in which the UE performs transmission and S14/S16 may be performed through one operation in which the BS performs transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
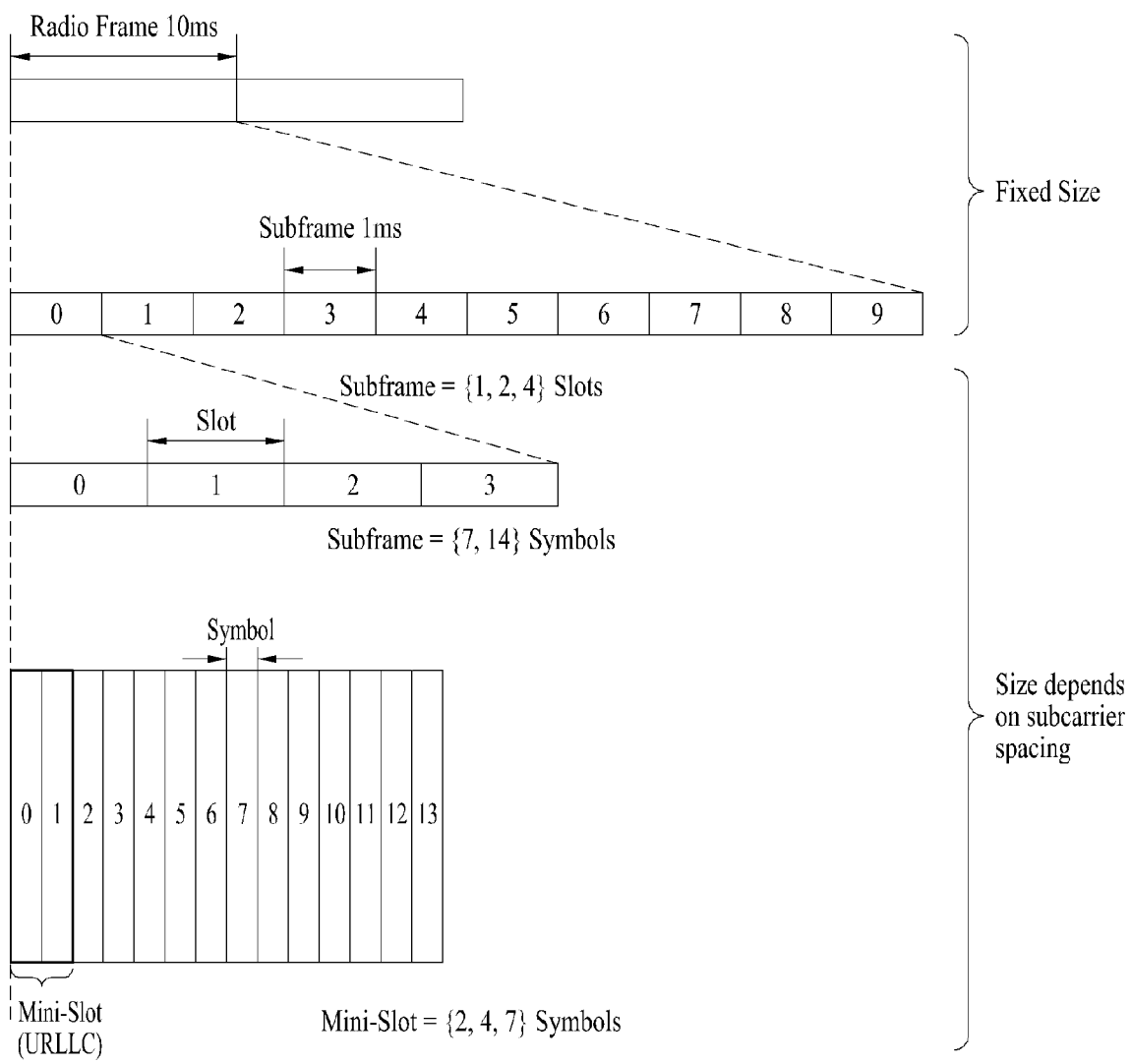
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. Tc and Ts which is an LTE-based time unit and sampling time, given as $T_s=1/((15$ kHz)*2048) are placed in the following relationship: $T_s/T_c=64$. DL and UL transmissions are organized in (radio) frames each having a duration of $T_f=(\Delta f_{max}x*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe-1}\}$ in an increasing order in a subframe, and with $n^\mu_{s,f} \in \{0, \ldots, N^{slot,\mu}_{subframe-1}\}$ in an increasing order in a radio frame. One slot includes $N^\mu_{symb}$ consecutive OFDM symbols, and $N^\mu_{symb}$ depends on a CP. The start of a slot $n\mu s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |

TABLE 3-continued

| μ | $N^{slot}_{symb}$ | $N^{frame,\mu}_{slot}$ | $N^{subframe,\mu}_{slot}$ |
|---|---|---|---|
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
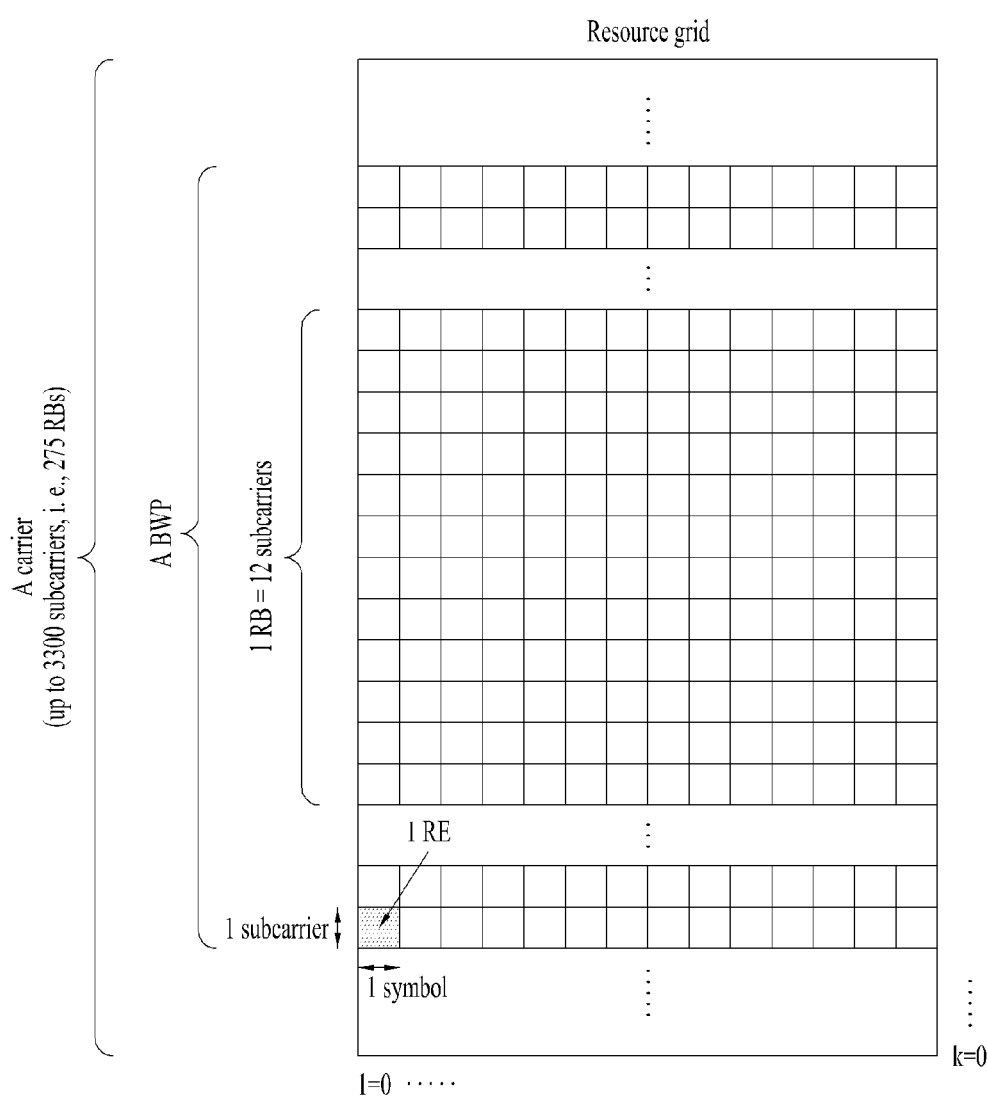
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

1.3. BWP (Bandwidth Part)

In the NR system to which the present disclosure is applicable, a frequency resource of up to 400 MHz may be allocated/supported for each CC. When a UE operating in such a wideband CC always operates with a radio frequency (RF) module for the entire CCs turned on, battery consumption of the UE may increase. Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC. Alternatively, the maximum bandwidth capability may be different for each UE. In consideration of the above situation, the BS may indicate/configure the UE to operate only in a partial bandwidth instead of the entire bandwidth of the wideband CC. The partial bandwidth may be defined as a BWP.

A BWP may include consecutive RBs on the frequency axis, and one BWP may correspond to one numerology (e.g., SCS, CP length, slot/mini-slot duration, and so on). The BS may configure a plurality of BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells. The BS may configure at least one DL/UL BWP for the UE associated with the wideband CC and activate at least one DL/UL BWP among the configured DL/UL BWP(s) at a specific time (through L1 signaling (e.g., DCI), MAC or RRC signaling, etc.). The activated DL/UL BWP may be called an active DL/UL BWP. The UE may fail to receive DL/UL BWP configurations from the BS during an initial access procedure or before setting up an RRC connection. A DL/UL BWP assumed by such a UE is defined as an initial active DL/UL BWP.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

1.4. Transmission of Synchronization Signal Block (SSB) and Related Operation FIG. 4 is a diagram illustrating the structure of a synchronization signal block (SSB) to which various embodiments of the present disclosure are applicable.

A UE may perform cell search, system information acquisition, beam alignment for initial access, DL measurement, and so on based on an SSB. The term SSB is interchangeably used with synchronization signal/physical broadcast channel (SS/PBCH) block.

Figure 4:
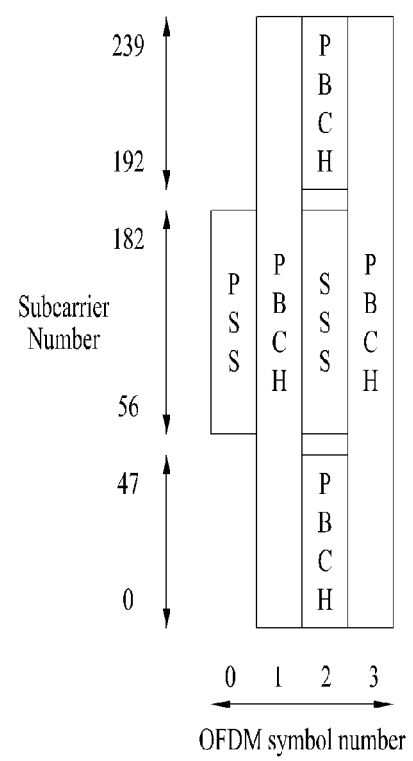
FIG. 4 is a diagram illustrating the structure of a synchronization signal block (SSB) to which various embodiments of the present disclosure are applicable.

Referring to FIG. 4, the SSB to which various embodiments of the present disclosure are applicable may include 20 RBs in four consecutive OFDM symbols. Further, the SSB may include a PSS, an SSS, and a PBCH, and the UE may perform cell search, system information acquisition, beam alignment for initial access, DL measurement, and so on based on the SSB.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Cell Search

Cell search refers to a procedure in which the UE acquires time/frequency synchronization of a cell and detects a cell ID (e.g., physical layer cell ID (PCID)) of the cell. The PSS may be used to detect a cell ID within a cell ID group, and the SSS may be used to detect the cell ID group. The PBCH may be used in detecting an SSB (time) index and a half-frame.

The cell search procedure of the UE may be summarized as described in Table 5 below.

TABLE 5

| | Type of Signals | Operations |
|---|---|---|
| 1$^{st}$ step | PSS | SS/PBCH block (SSB) symbol timing acquisition<br>Cell ID detection within a cell ID group (3 hypothesis) |
| 2$^{nd}$ Step | SSS | Cell ID group detection (336 hypothesis) |
| 3$^{rd}$ Step | PBCH DMRS | SSB index and Half frame (HF) index (Slot and frame boundary detection) |
| 4$^{th}$ Step | PBCH | Time information (80 ms, System Frame Number (SFN), SSB index, HF) Remaining Minimum System Information (RMSI) Control resource set (CORESET)/Search space configuration |
| 5$^{th}$ Step | PDCCH and PDSCH | Cell access information RACH configuration |

There are 336 cell ID groups each including three cell IDs. There are 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 5:
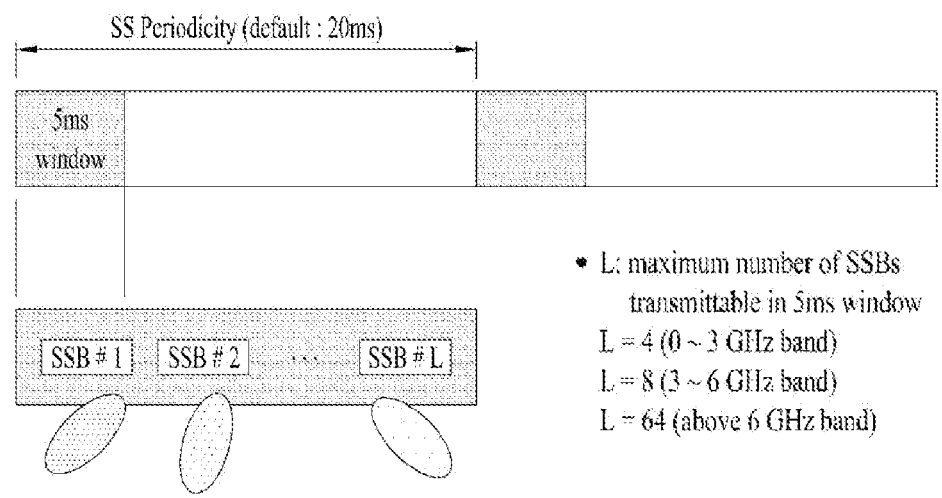
FIG. 5 is a diagram illustrating an exemplary SSB transmission method to which various embodiments of the present disclosure are applicable.

FIG. 5 is a diagram illustrating an exemplary SSB transmission method to which various embodiments of the present disclosure are applicable.

Referring to FIG. 5, the SSB is periodically transmitted according to an SSB periodicity. A default SSB periodicity assumed by the UE during initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in time order within the SSB burst set (i.e., half-frame). In the description of various embodiments of the present disclosure, the candidate SSB and the SSB candidate may be interchangeably used.

Case A: 15-kHz SCS: The indexes of the first symbols of candidate SSBs are given as {2, 8}+14*n for operation without shared spectrum channel access (e.g., L-band, LCell): where n=0, 1 for a carrier frequency equal to or less than 3 GHz and n=0, 1, 2, 3 for a carrier frequency of 3 GHz to 6 GHz.

for operation with shared spectrum channel access)(예, U-band, UCell): n=0, 1, 2, 3, 4.

Case B: 30-kHz SCS: The indexes of the first symbols of candidate SSBs are given as $\{4, 8, 16, 20\}+28*n$ where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as $\{2, 8\}+14*n$ For operation without shared spectrum channel access: (1) In the case of a paired spectrum operation where n=0, if for a carrier frequency equal to or less than 3 GHz and n=0, 1, 2, 3 for a carrier frequency within FR1 and greater than 3 GHz. (2) In the case of a non-paired spectrum operation, where n=0, 1 for a carrier frequency equal to or less than 2.4 GHz and n=0, 1, 2, 3 for a carrier frequency within FR1 and greater than 2.4 GHz.

For operation with shared spectrum channel access: where n=0, 1, 2, 3, 4, 6, 7, 8, 9.

Case D: 120-kHz SCS: The indexes of the first symbols of candidate SSBs are given as $\{4, 8, 16, 20\}+28*n$ where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as $\{8, 12, 16, 20, 32, 36, 40, 44\}+56*n$ where n=0, 1, 2, 3, 5, 6, 7, 8 for a carrier frequency above 6 GHz.

2. V2X (Vehicle-to-Everything)

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

Figure 6:
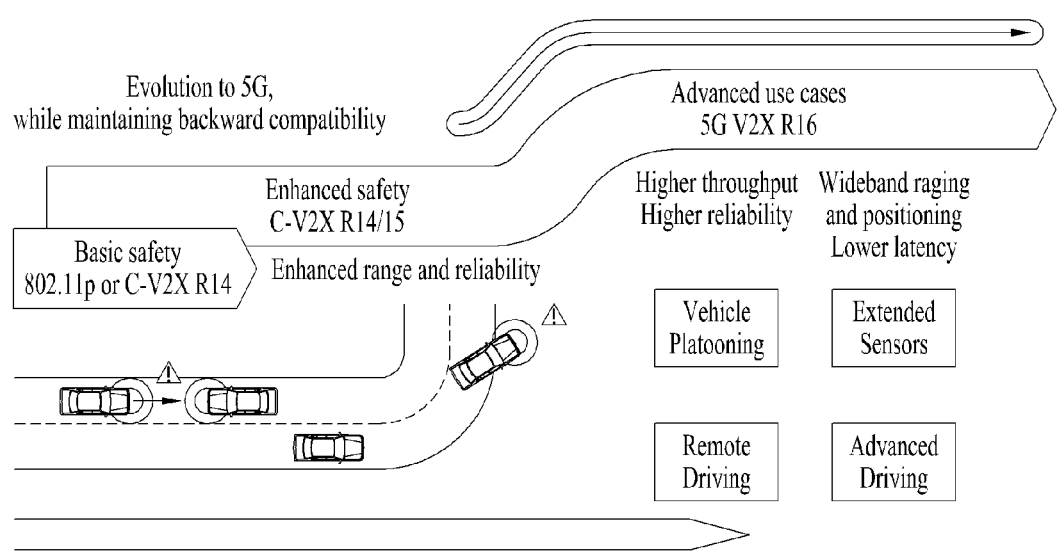
FIG. 6 is a diagram for explaining V2X communication to which various embodiments of the present disclosure are applicable.

FIG. 6 is a diagram for explaining V2X communication according to various embodiments of the present disclosure.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

Figure 7:
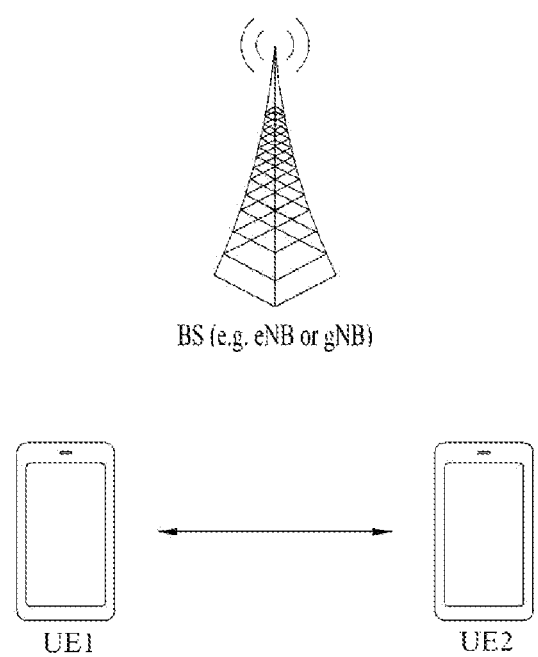
FIG. 7 is a diagram showing a UE that performs V2X or SL communication according to various embodiments of the present disclosure.

FIG. 7 is a diagram showing a UE that performs V2X or SL communication according to various embodiments of the present disclosure.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

2.1. V2X Synchronization/Synchronization Procedure

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in physical layer, and a master information block-sidelink-V2X (MIB-SL-V2X) may be used in a radio link control (RLC) layer.

Figure 8:
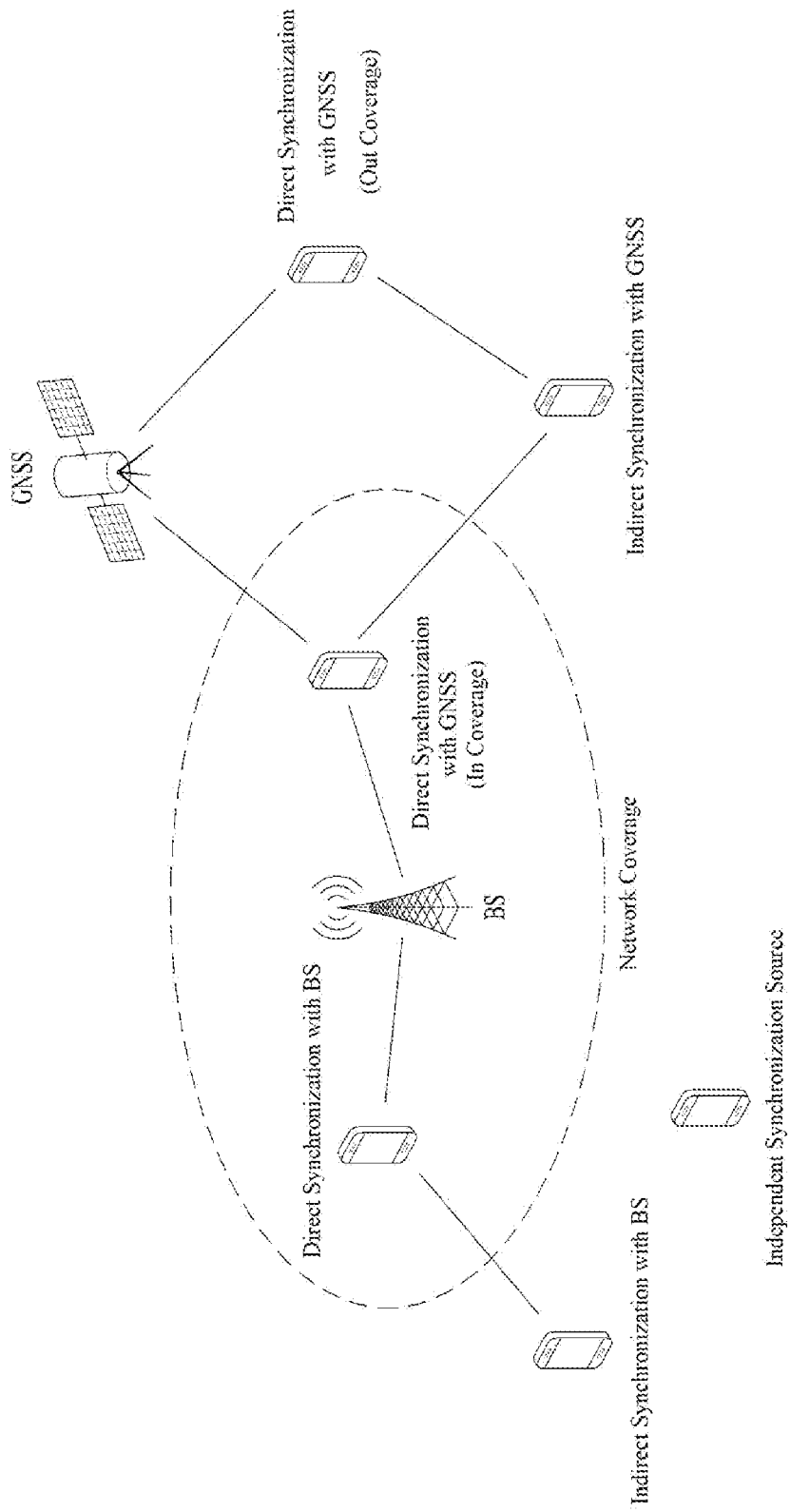
FIG. 8 is a diagram showing a synchronization source or synchronization reference of V2X to which various embodiments of the present disclosure are applicable.

FIG. 8 is a diagram showing a synchronization source or synchronization reference of V2X to which various embodiments of the present disclosure are applicable.

Referring to FIG. 8, in V2X, a UE may be directly synchronized with global navigation satellite systems (GNSS) or may be indirectly synchronized with the GNSS through a UE that is directly synchronized with the GNSS (within network coverage or outside the network coverage). When the GNSS is configured as a synchronization source, the UE may calculate a direct frame number (DFN) and a subframe number using a coordinated universal time (UTC) and (pre)configured DFN offset.

Alternatively, the UE may be directly synchronized with a BS or may be synchronized with another time/frequency-synchronized UE. For example, the BS may be an e node B (eNB) or a g node B (gNB). For example, when the UE is within network coverage, the UE may receive synchronization information provided by the BS and may be directly synchronized with the BS. Then, the UE may provide the synchronization information to another adjacent UE. When UE timing is configured as synchronization reference, the UE may comply with a cell related to a corresponding frequency (the UE is within cell coverage at the frequency) and a primary cell or a serving cell (the UE is outside cell coverage at the frequency) for synchronization and DL measurement.

The BS (e.g., a serving cell) may provide synchronization configuration used for V2X or SL communication. In this case, the UE may comply with the synchronization configuration received from the BS. When the UE does not detect any cell in a carrier used in the V2X or SL communication and does not receive synchronization configuration from the serving cell, the UE may comply with a preconfigured synchronization configuration.

Alternatively, the UE may be synchronized with another UE that does not directly or indirectly acquire synchronization information from the BS or the GNSS. A synchronization source and preference may be preconfigured for the UE. Alternatively, the synchronization source and preference may be configured through a control message provided by the BS.

Hereinafter, a sidelink (SL) synchronization signal (SLSS) and synchronization information will be described.

The SLSS is an SL-specific sequence and may include a primary sidelink synchronization signal (PSSS) and a secondary sidelink synchronization signal (SSSS). The PSSS may be referred to as a sidelink primary synchronization signal (S-PSS) and the SSSS may be referred to as a sidelink secondary synchronization signal (S-SSS). For example, length-127 M-sequences may be used with respect to the S-PSS, and the length-127 gold sequences may be used with respect to the S-SSS. For example, the UE may detect an initial signal using the S-PSS and may acquire synchronization. For example, the UE may acquire detailed synchronization using the S-PSS and the S-SSS and may detect a synchronization signal ID.

A physical sidelink broadcast channel (PSBCH) may be a (broadcast) channel through which basic (system) information that the UE needs to know first is transmitted prior to before transmission and reception of an SL signal. For example, the basic information may include information related to the SLSS, a duplex mode (DM), time division duplex uplink/downlink (TDD UL/DL) configuration, information related to a resource pool, a type of an application related to the SLSS, subframe offset, and broadcast information. For example, for evaluation of PSBCH performance, in NR V2X, a payload size of the PSBCH may be 56 bits including CRC of 24 bits.

The S-PSS, the S-SSS, and the PSBCH may be included in a block format (e.g., a synchronization signal (SL SS)/PSBCH block, hereinafter Sidelink-Synchronization Signal Block (S-SSB)) for supporting periodic transmission. The S-SSB may have the same numerology (i.e., a SCS and CP length) as a physical sidelink control channel (PSCCH)/physical sidelink shared channel (PSSCH) in a carrier, and a transmission bandwidth may be present within a (pre) configured Sidelink BWP (SL BWP). For example, a bandwidth of the S-SSB may be 11 resource blocks (RBs). For example, the PSBCH may be present over 11 RBs. A frequency position of the S-SSB may be (pre)configured. Thus, the UE needs not perform hypothesis detection at a frequency for discovering the S-SSB in a carrier.

In an NR SL system, a plurality of numerologies having different SCS and/or CP lengths may be supported. In this case, as the SCS increases, the length of a time resource in which a transmission UE supports the S-SSB may be reduced. Thus, coverage of the S-SSB may be reduced. Thus, in order to ensure the coverage of the S-SSB, the transmission UE may transmit one or more S-SSBs to a reception UE within one S-SSB transmission period according to the SCS. For example, the number of S-SSBs that are transmitted to the reception UE from the transmission UE within one S-SSB transmission period may be preconfigured or configured. For example, the S-SSB transmission period may be 160 ms. For example, a S-SSB transmission period of 160 ms may be supported for all SCSs.

For example, when the SCS is 15 kHz in FR1, the transmission UE may transmit one or two S-SSBs to the reception UE within one S-SSB transmission period. For example, when the SCS is 30 kHz in FR1, the transmission UE may transmit one or two S-SSBs to the reception UE within one S-SSB transmission period. For example, when the SCS is 60 kHz in FR1, the transmission UE may transmit one, two, or four S-SSBs to the reception UE within one S-SSB transmission period.

For example, when the SCS is 60 kHz in FR2, the transmission UE may transmit 1, 2, 4, 8, 16, or 32 S-SSBs to the reception UE within one S-SSB transmission period. For example, when the SCS is 120 kHz in FR2, the transmission UE may transmit 1, 2, 4, 8, 16, 32, or 64 S-SSBs to the reception UE within one S-SSB transmission period.

When the SCS is 60 kHz, two types of CPs may be supported. In addition, according to a CP type, a structure of the S-SSB transmitted to the reception UE from the transmission UE may be changed. For example, the CP type may be a normal CP (NCP) or an extended CP (ECP). In detail, for example, when a CP type is an NCP, the number of symbols for mapping the PSBCH within the S-SSB transmitted from the transmission UE may be 9 or 8. In contrast, for example, when a CP type is an ECP, the number of symbols for mapping the PSBCH within the S-SSB transmitted from the transmission UE may be 7 or 6. For example, the PSBCH may be mapped to a first symbol within the S-SSB transmitted from the transmission UE. For example, the reception UE that receives the S-SSB may perform an automatic gain control (AGC) in a first symbol period of the S-SSB.

Figure 9:
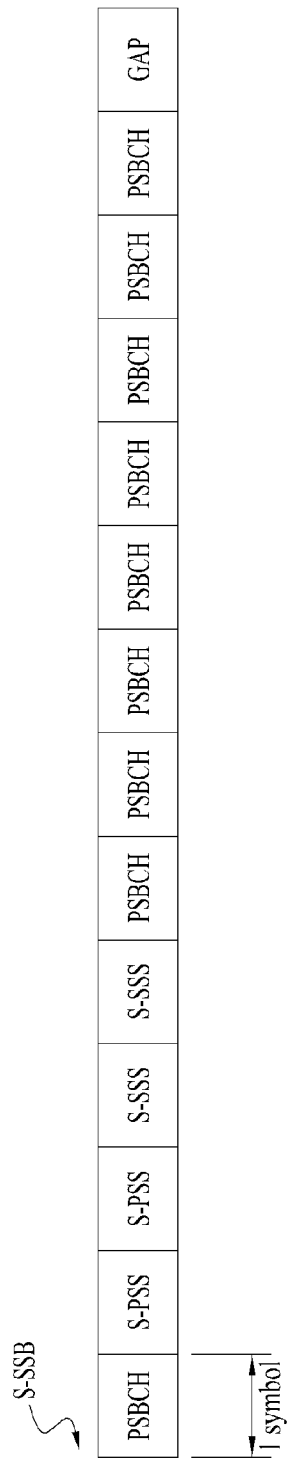
FIG. 9 is a diagram showing a structure of an S-SSB when a CP type is an NCP according to various embodiments of the present disclosure.

FIG. 9 is a diagram showing a structure of an S-SSB when a CP type is an NCP according to various embodiments of the present disclosure.

Figure 10:
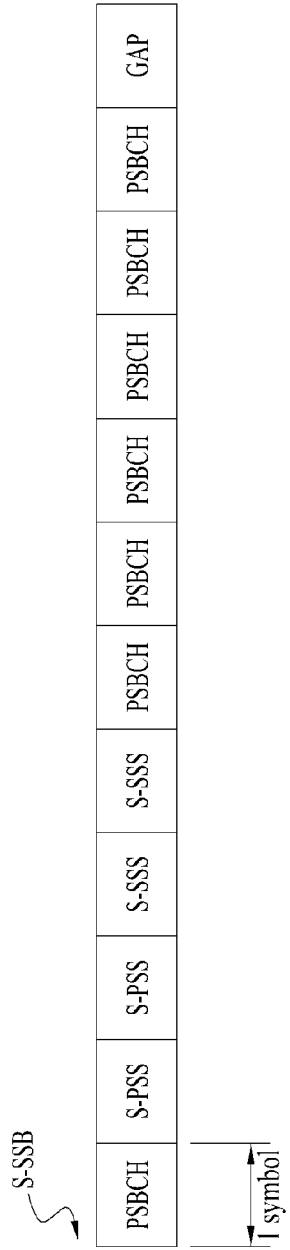
FIG. 10 is a diagram showing a structure of an S-SSB when a CP type is an ECP according to various embodiments of the present disclosure.

For example, when the CP type is NCP, FIG. 10 may be referred to for the structure of the S-SSB, that is, the order of symbols to which the S-PSS, S-SSS and PSBCH are mapped in the S-SSB transmitted by the transmitting UE.

FIG. 10 is a diagram showing a structure of an S-SSB when a CP type is an ECP according to various embodiments of the present disclosure.

In the ECP case, for example, the number of symbols to which the PSBCH is mapped after the S-SSS in the S-SSB may be 6, unlike FIG. 10. Therefore, the coverage of the S-SSB may be different depending on whether the CP type is NCP or ECP.

Each SLSS may have a sidelink synchronization identifier (SLSS ID).

For example, in LTE SL or LTE V2X, the values of SLSS IDs may be defined based on combinations of two different S-PSS sequences and 168 different S-SSS sequences. For example, the number of SLSS IDs may be 336. For example, the value of an SLSS ID may be any one of 0 to 335.

For example, in NR SL or NR V2X, the values of SLSS IDs may be defined based on combinations of two different S-PSS sequences and 336 different S-SSS sequences. For example, the number of SLSS IDs may be 672. For example, the value of an SLSS ID may be any one of 0 to 671. For example, one of the two different S-PSSs may be associated with in-coverage and the other S-PSS may be associated with out-of-coverage. For example, the SLSS ID of 0 to 335 may be used for in-coverage, whereas the SLSS IDs of 336 to 671 may be used for out-coverage.

In order to improve the S-SSB reception performance of the receiving UE, the transmitting UE needs to optimize transmission power according to the characteristics of each signal included in the S-SSB. For example, the transmitting UE may determine a maximum power reduction (MPR) value for each signal included in the S-SSB according to the peak-to-average power ratio (PAPR) of the signal. For example, when the PAPR value is different between the S-PSS and the S-SSS in the S-SSB, the transmitting UE may apply an optimal MPR value to each of the S-PSS and the S-SSS to improve the S-SSB reception performance of the receiving UE. For example, a transition period may further be applied so that the transmitting UE performs an amplification operation for each signal. The transition period may preserve a time required for a transmission-end amplifier of the transmitting UE to perform a normal operation at the boundary at which the transmission power of the transmitting UE is changed. For example, the transition period may be 10 us in FR1, and 5 us in FR2. For example, a search window in which the receiving UE detects the S-PSS may be 80 ms and/or 160 ms.

2.2. Resource Allocation

A resource pool may be a set of time-frequency resources to be used for SL transmission and/or SL reception. In terms of a UE, time domain resources in the resource pool may not be consecutive. A plurality of resource pools may be (pre) configured for the UE within one carrier. In terms of a physical layer, the UE may perform unicast, group cast, and broadcast communication using a configured or preconfigured resource pool.

Figure 11:
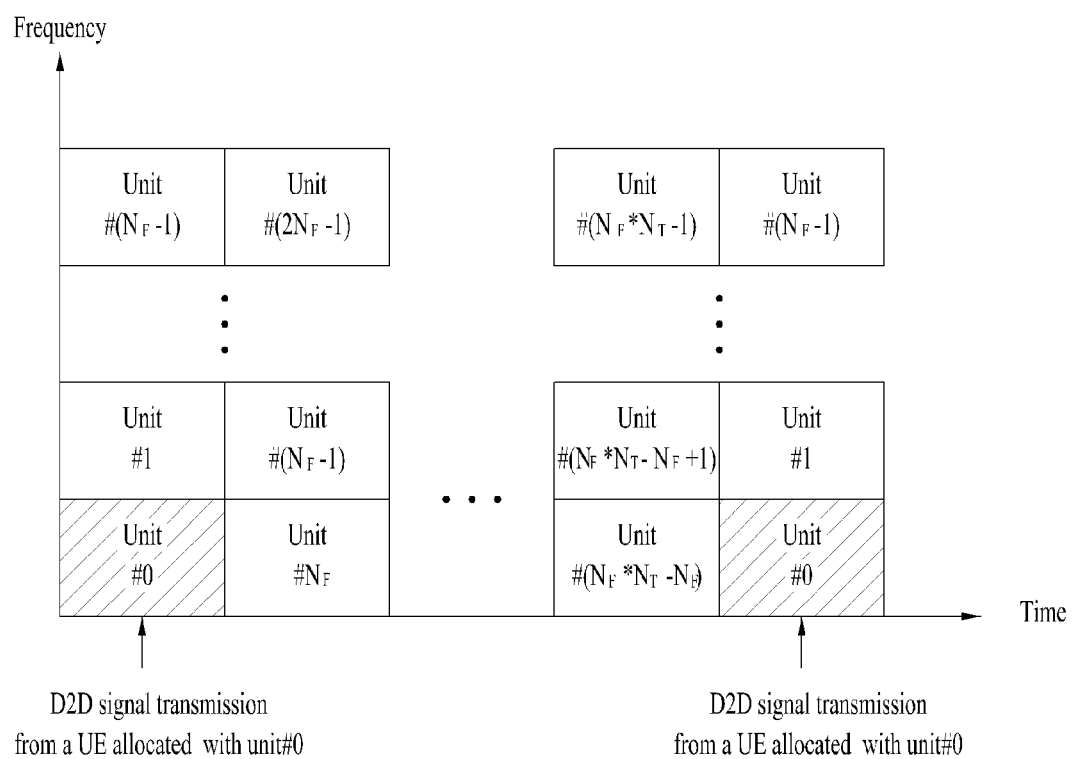
FIG. 11 is a diagram showing a resource unit for V2X or SL communication according to various embodiments of the present disclosure.

FIG. 11 is a diagram showing a resource unit for V2X or SL communication according to various embodiments of the present disclosure.

Referring to FIG. 11, the total frequency resources of a resource pool may be divided into NF frequency resources, and the total time resources of the resource pool may be divided into NT time resources. Thus, a total of NF*NT resource units may be defined in the resource pool. FIG. 11 illustrates an example in which the resource pool is repeated with a periodicity of NT subframes.

Figure 13:
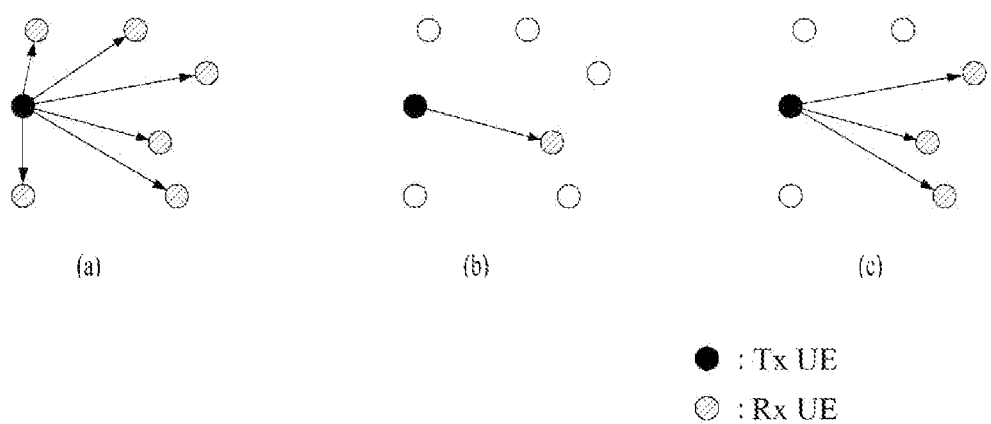
FIG. 13 is a diagram showing three types of cast types according to various embodiments of the present disclosure.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 12:
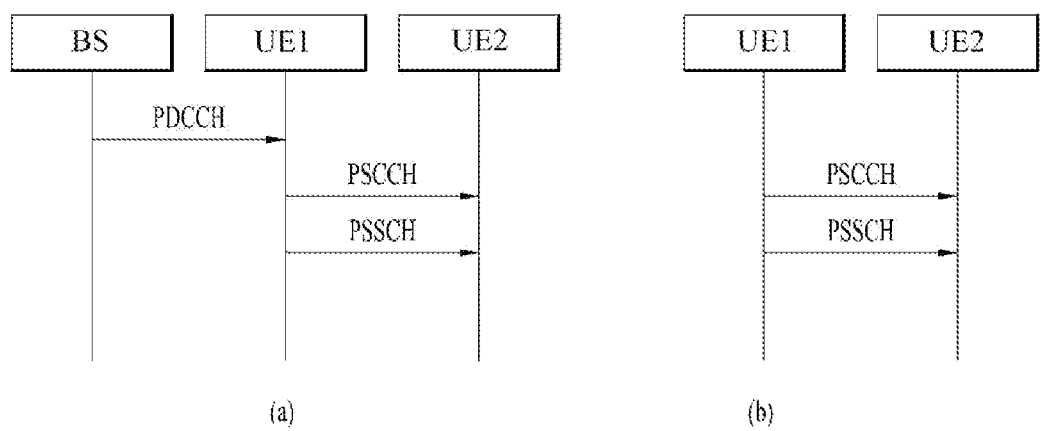
FIG. 12 is a diagram showing a procedure in which a UE performs V2X or SL communication depending on a transmission mode according to various embodiments of the present disclosure.

FIG. 12 is a diagram showing a procedure in which a UE performs V2X or SL communication depending on a transmission mode according to various embodiments of the present disclosure.

In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 12(a) illustrates a UE operation related to LTE transmission mode 1 or LTE transmission mode 3. Alternatively, for example, FIG. 14(a) illustrates a UE operation related to NR resource allocation mode 1. For example, LTE transmission mode 1 may be applied to general SL communication, and LTE transmission mode 3 may be applied to V2X communication.

For example, FIG. 12(b) illustrates a UE operation related to LTE transmission mode 2 or LTE transmission mode 4. Alternatively, for example, FIG. 14(b) illustrates a UE operation related to NR resource allocation mode 2.

Referring to FIG. 12(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 12(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at $T1 \geq 0$, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI (sidelink control information) will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or
  an SL channel state information (CSI) report request indicator or SL (L1) RSRP (and/or SL (L1) reference signal received quality (RSRQ) and/or SL (L1) received signal strength indicator (RSSI)) report request indicator, and/or
  an SL CSI transmission indicator (on PSSCH) (or SL (L1) RSRP (and/or SL (L1) RSRQ and/or SL (L1) RSSI) information transmission indicator), and/or
  MCS information, and/or
  transmission power information, and/or
  L1 destination ID information and/or L1 source ID information, and/or
  SL HARQ process ID information, and/or
  new data indicator (NDI) information, and/or
  redundancy version (RV) information, and/or
  QoS information (related to transmission traffic/packet), for example, priority information, and/or
  An SL CSI-RS transmission indicator or information about the number of SL CSI-RS antenna ports (to be transmitted);
  Location information about a transmitting UE or location (or distance area) information about a target receiving UE (requested to transmit an SL HARQ feedback), and/or
  RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

2.3. Cast Type

FIG. 13 is a diagram showing three types of cast types according to various embodiments of the present disclosure.

Specifically, FIG. 13(a) illustrates broadcast-type SL communication, FIG. 13(b) illustrates unicast-type SL communication, and FIG. 13(c) illustrates groupcast-type SL communication. In unicast-type SL communication, a UE may perform one-to-one communication with another UE. In groupcast-type SL communication, the UE may perform SL communication with one or more UEs of a group to which the UE belongs. In various embodiments of the present disclosure, SL groupcast communication may be replaced with SL multicast communication, SL one-to-many communication, and so on.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

A/B/C: A, B, and/or C
comb: The comb may refer to a method of mapping a signal at a predetermined interval in the frequency domain. For example, comb 2 (comb-2 or 2-comb) may refer to mapping of the same specific DM-RS port to each RE spaced apart by two subcarriers. For example, comb 4 (comb-4 or 4-comb) may refer to mapping of the same specific DM-RS port to each RE spaced apart by four subcarriers.
D2D: device-to-device, and the D2D may be replaced with SL and/or V2X in the description of various embodiments of the present disclosure.
DMRS: demodulation reference signal
LSB: least significant bit
MSB: most significant bit
OFDM: orthogonal frequency division multiplexing
PBCH: physical broadcast channel
PSBCH: physical sidelink broadcast channel
PSSS: primary sidelink synchronization signal (sidelink primary synchronization signal (S-PSS))
SCS: subcarrier spacing
SL: sidelink
SLSS: sidelink synchronization signal
SS: synchronization signal
SSB: synchronization signal block
SS/PBCH block: synchronization signal/physical broadcast channel block
S-SSB: sidelink-synchronization signal block
S-SS/PSBCH block: sidelink-synchronization signal/physical sidelink broadcast channel block
SSSS: secondary sidelink synchronization signal (sidelink secondary synchronization signal (S-SSS))
V2X: vehicle-to-everything In the description of various embodiments of the present disclosure, a frame may be replaced with a half frame and/or a unit time.

Various embodiments of the present disclosure may be related to a design of a synchronization signal block appropriate for NR sidelink transmission.

Various embodiments of the present disclosure may be related to a method indicating a bit representing a slot index using an S-SSB PBCH (PSBCH) DMRS and/or a PBCH (PSBCH) payload.

For example, in NR V2X, when it is assumed that the S-SSB is transmitted in any slot that is not a specific position in a frame and a method such as NR SS/PBCH DMRS is applied, even if an SS/PBCH (S-SSB) block index is detected from a PBCH DMRS (PSBCH DMRS) sequence, it may be difficult for the UE to know a slot index in which a SS/PBCH (S-SSB) block is positioned.

For example, a PBCH included in an NR Uu SS/PBCH block may be transmitted with a DMRS. For example, a sequence applied to the DMRS may be generated/acquired using a cell identifier (ID) and/or an SS/PBCH block index as an initial value. For example, positions of slots and/or OFDM symbols in which candidate SS/PBCH block are to be arranged may be defined for each SS/PBCH index, and when an SS/PBCH block index is determined during a PBCH DMRS sequence detection procedure of the SS/PBCH block, the UE may recognize the positions of the SS/PBCH block slots and/or OFDM symbols corresponding to the detected index, and thus, may recognize a frame boundary.

(Synchronization Procedure)

In contrast, for example, in NR V2X, when it is assumed that the S-SSB is transmitted in any slot that is not a specific position in a frame and a method such as NR SS/PBCH DMRS is applied, even if the UE detects an SS/PBCH block (S-SSB) index from a PBCH DMRS (PSBCH DMRS) sequence, it may be difficult for the UE to know a slot index in which a SS/PBCH block (S-SSB) is positioned, and accordingly, there may be a need for a new method based on which the UE is capable of recognizing the slot index.

For example, in NR V2X, the S-SSB may be transmitted and received at an arbitrary position (and/or an arbitrary slot) within (one or more) frames rather than being transmitted and received within a predetermined candidate position. Thus, for example, even if an S-SSB index is detected from a PSBCH DMRS sequence, the S-SSB may be transmitted and received at an arbitrary position within a frame, and accordingly, it may be difficult for the UE to know the position (e.g., a slot index in which the S-SSB is transmitted and received) of the S-SSB through only the S-SSB index, and thus there may be a need for a new method based on which the UE is capable of recognizing the slot index in which the S-SSB is transmitted and received.

Figure 14:
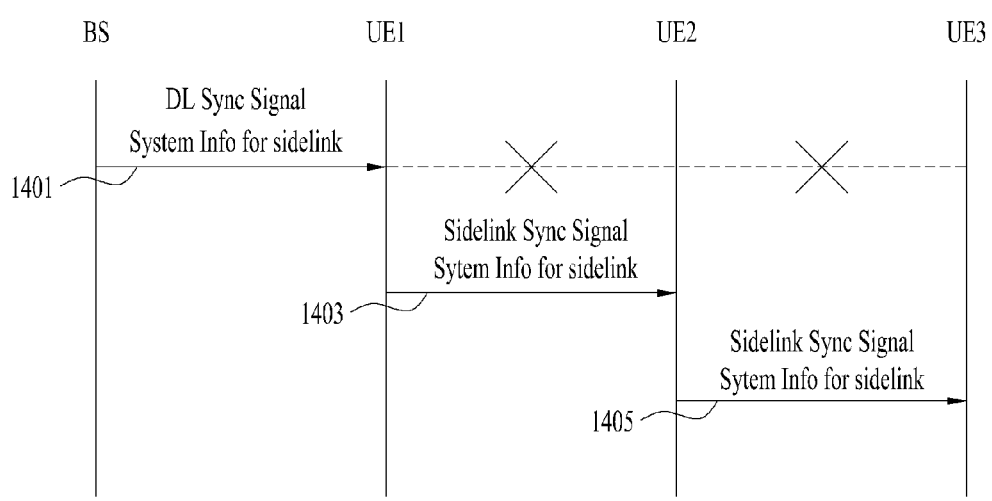
FIG. 14 is a diagram showing an example of a resource configuration of a BS and a procedure of transmitting and receiving a synchronization signal between UEs according to various embodiments of the present disclosure.

FIG. 14 is a diagram showing an example of a resource configuration of a BS and a procedure of transmitting and receiving a synchronization signal between UEs according to various embodiments of the present disclosure.

FIG. 14 is a diagram for explaining a procedure of configuring a resource for D2D in a BS and a procedure of transmitting and receiving a D2D synchronization signal between UEs.

Referring to FIG. 14, in operation 1401 according to an exemplary embodiment, the BS may transmit a downlink synchronization signal and may also transfer sidelink system information. Here, for example, there may be UE1 that detects the downlink synchronization signal transmitted from the BS and acquires the sidelink system information transmitted from the BS. For example, there may be UE2 and UE3 that do not acquire information. For example, UE2 and UE3 may not acquire one or more of the downlink synchronization signal and/or the sidelink system information.

In operation 1403 according to an exemplary embodiment, UE1 may transmit the sidelink synchronization using a D2D resource allocated from the BS. For example, a resource at a (pre)promised/configured position may be used as at least a frequency resource of the D2D resource, and a resource allocated from the BS may be allocated as a time resource. For example, UE1 may transfer the sidelink system information acquired from the BS to a surrounding UE. For example, the UE2 adjacent to the UE1 may be in the state in which the sidelink system information is not capable of being acquired from the BS and may attempt to detect the sidelink synchronization signal at a prepromised frequency position for sidelink. For example, when detecting the synchronization signal transmitted by the UE1 (when detecting the synchronization signal transmitted from the UE1), the UE2 may acquire the sidelink system information transmitted by the UE1.

In operation 1405 according to an exemplary embodiment, the UE2 may transmit the sidelink synchronization signal and the sidelink system information based on the sidelink system information acquired from the UE1. For example, the UE3 adjacent to the UE2 may be in the state in which the sidelink system information is not capable of being acquired from the BS and may attempt to detect the sidelink synchronization signal at a prepromised frequency position for sidelink. For example, when detecting the synchronization signal transmitted by the UE2 (when detecting the synchronization signal transmitted from the UE2), the UE3 may acquire the sidelink system information transmitted by the UE2.

For example, a UE present in out-of-coverage may also transmit a sidelink signal at a prepromised frequency position.

In this situation, for example, embodiments of a sidelink synchronization signal transmitted between UEs may be configured as follows. That is, for example, synchronization signals used for sidelink may be configured based on one or more of various embodiments of the present disclosure, which are described below.

The BS, the UE1, the UE2, and the UE3 of FIG. 14 may be merely an example of various embodiments of the present disclosure, and the BS, the UE1, the UE2, and the UE3 may each be replaced with various devices. For example, the BS, the UE1, the UE2, and the UE3 may each be replaced with one or more of various devices shown in FIGS. 20 to 30.

In a distributed node system such as sidelink according to various embodiments of the present disclosure, a specific node may transmit a representative synchronization signal and one or more other UEs (nodes) may be synchronized with this. That is, for example, for sidelink signal transmission and reception, some nodes (in this case, the nodes may be GNSS, BS, eNB, gNB, NR UE, LTE V2X sidelink, NR V2X sidelink UE, or the like.) may transmit a synchronization signal and the other UEs (nodes) may be synchronized with this and may transmit and receive a signal.

S-PSBCH Design

For example, the SLSS may be a primary sidelink synchronization signal (PSSS) or a secondary sidelink synchronization signal (SSSS). For example, the S-SSB and/or the S-SS/PSBCH block may include a PSSS, a SSS, and a PSBCH.

Sidelink Synchronization Signal

For example, one of design criteria of the S-PSS may have a low correlation with the PSS to avoid false detection with respect to both of the S-PSS and the PSS.

For example, in order to ensure a low false detection with a PSS symbol, the same sequence polynomial and/or initial value as a PSS (symbol) maximum sequence (m-sequence) may be used, but a different cyclic shift from a PSS (symbol) sequence may be used to generate/acquire an S-PSS m-sequence.

For example, a cyclic shift value of the S-PSS may be determined to maximize tolerance with respect to carrier frequency offset (CFO). For example, this may lower a probability of false detection because the CFO rotates a confusing sequence that confuses a sequence with another cyclic shift sequence in the frequency domain.

For the above reasons, for example, a cyclic shift for the S-PSS m-sequence may be determined to satisfy two conditions:

The maximum distance between different cyclic shift values and the values may be dependent upon S-PSS hypotheses.

The maximum distance from the cyclic shift value of the PSS

For example, the PSS may use three cyclic shift values separated from each other by 43, which may be evenly spread over the entire possible candidate range or [0, . . . , 127]. For example, when S-PSS hypotheses are two (e.g., in-coverage and out-of-coverage), a cyclic shift value of the S-PSS may be, for example, 21 or 22 in order to satisfy the above two conditions while avoiding a value of the PSS.

For example, the S-SSS symbol may use a gold sequence generated/acquired based on two m-sequences, and may be generated/acquired using the same sequence polynomial and/or initial value as the SSS (symbol) and a different cyclic shift value from the SSS. For example, a first m-sequence used for the S-SSS gold sequence may use a cyclic shift value evenly spread to the maximum length from the first m-sequence of the SSS gold sequence, from which a low correlation with the SSS is acquired and tolerance with respect to CFO is maximized.

For example, a cyclic shift value of a second m-sequence of the S-SSS gold sequence may or may not be the same as a cyclic shift value of a second m-sequence of the SSS gold sequence depending on the number of SL service set identifiers (SL-SSID).

For example, in relation to CFO estimation, there may be trade-off between the amount of CFO to be estimated and the distance between the positions of two S-SSS symbols.

For example, when the CFO is relatively small, a relatively long distance may be appropriate for accurate offset estimation. In contrast, for example, when the CFO is relatively high, a long distance may cause offset estimation ambiguity, and in this case, a relatively short distance or an adjacent location may facilitate accurate CFO estimation. As a result, for example, advantages may vary depending on the amount of residual CFO after S-PSS synchronization. For example, when the distance between the two S-SSS symbols is relatively long, if a Doppler channel is high, detection performance may be degraded and the size of a buffer memory may be increased in proportion to the distance.

For example, 672 SL-SSIDs may be used to support a larger number of synchronization sources like in NR. For example, the NR may operate in a higher frequency range than LTE, and thus the number of synchronization clusters may be increased due to reduced coverage due to the characteristics of a radio frequency (RF). For example, in NR Uu, 1008 SSIDs may be used, and thus the complexity of a receiver using 672 SL-SSIDs may be problematic in terms of implementation.

For example, among 672 SL-SSIDs, the S-PSS may support two identical hypotheses as LTE S-PSS. For example, the S-SSS may use 366 hypotheses, which may configure 672 of total S-SSS sequences coupled to 2 S-PSS sequences. In addition, for example, the hypotheses for the S-PSSS and the S-SSS may not exceed hypotheses for the NR PSS and the SSS, and thus a problem in terms of complexity may not be problematic.

For example, NR V2X SSIDs may have the number of 672 and may be a combination of 2 S-PSS candidates*336 S-SSS candidates. For example, the S-PSS ID and the S-SSS ID may be derived from the SL-SSID.

For example, in LTE SL, an SLSS relaying hop count of a UE, which selects another UE based on synchronization reference, may be indicated by two methods.

For example, a first method may be a method of setting an inCoverage field in a PSBCH to '0' when another UE that selects a GNSS or a BS through synchronized is synchronized with the UE.

For example, a second method may be a method of increasing an SL-SSID to 168 when another UE having an inCoverage field value of '0' is synchronized with the UE.

From this point, for example, an SL-SSID value for an in-coverage UE that is directly synchronized with a BS (eNB) may not always mean that the UE is actually positioned within coverage of the BS.

For example, in NR SL, an SL-SSID value may directly indicate an SLSS relaying hop count. For example, the SL-SSID value may be divided into four subgroups, and each group may indicate an SLSS relaying hop count as follows:

First group SL-SSID: directly synchronized with gNB/GNSS
Second group SL-SSID: synchronized with UE of first group SL-SSID
Third group SL-SSID: synchronized with UE of second group SL-SSID
Fourth group SL-SSID: UE of another case For example, through the aforementioned method, the synchronization procedure may be simplified, and additional signaling like the inCoverage field of the LTE SL may not be required.

S-SSB Structure

Figure 15:
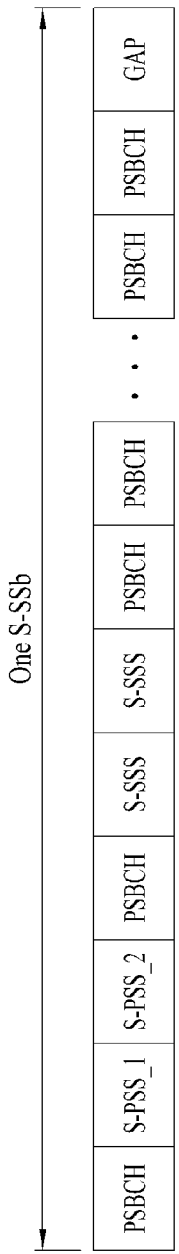
FIG. 15 is a diagram showing an example of a structure of an S-SSB according to various embodiments of the present disclosure.

FIG. 15 is a diagram showing an example of a structure of an S-SSB according to various embodiments of the present disclosure. A detail example may refer to FIGS. 9 and 10 and related description.

For example, different maximum power reduction (MPR) levels between the S-PSS and the S-SSS may be considered. For example, MPR levels are different, and thus one or more symbol durations may be present between the S-PSS and the S-SSS for the purpose of a transient period. For example, otherwise, some of the S-PSS and/or S-SSS symbol duration may be used as the transient period, and thus detection performance of the S-PSS and/or the S-SSS may be degraded.

For example, when the distance between the S-PSS and the S-SSS is excessively long, detection of the S-SSS is based on S-PSS synchronization, and thus when a Doppler channel is high, S-SSS detection performance may be degraded. For example, when S-PSS and S-SSS symbols are spaced apart from each other by 2 symbol durations, joint S-PSS/S-SSS detection performance may be degraded by about 0.8 decibel (dB).

For example, the S-SSB may be configured as follows. For example, the following parts may be included in and/or may fit in a single slot according to an allowed SL slot format:

automatic gain control (AGC) symbol
2 S-PSS symbol
2 S-SSS symbol
n PSBCH symbol (n being an integer/natural number equal to or greater than 0)
TX/RX (transmit/receive) switching gap For example, the AGC symbol duration may function as a transient period prior to an S-PSS symbol. For example, in consideration of a combination of a carrier frequency and an SCS, one PSBCH symbol period may be sufficient to the purpose of a transient period after the S-PSS. For example, it may be advantageous for S-SSS synchronization detection to have as short a distance as possible between the S-PSS and the S-SSS.

For example, the number of PSBCH symbols may be determined according to the amount of PSBCH content and decoding performance. For example, the number of AGC symbols and the number of TX/RX switching gap symbols may be determined to satisfy predetermined requirements.

For example, the S-SSB may be periodically transmitted at a fixed period irrespective of numerology. For example, in the case of LTE-SL, the S-SSB may be transmitted once within a predetermined period. For example, the NR S-SSB may be transmitted once within a predetermined period. For example, in the case of other numerology, criteria may provide the same performance and/or coverage irrespective of numerology.

For example, when the SCS is increased, a required bandwidth (BW) is proportionally increased, thereby increasing a noise BW. For example, in order to compensate for a signal to noise ratio (SNR) based on the increased noise BW, a larger number of S-SSBs need to be transmitted. For example, the number of S-SSBs may be proportional to the SCS in terms of the SNR. As a result, for example, with respect to an SCS of 30 kHz and 60 kHz, the S-SSB may be transmitted twice and four times compared with 15 kHz in FR1. For example, the same rule may also be applied to an SCS of 60 kHz and 120 kHz of FR2.

For example, for FR1, the number of S-SSBs within a period may be fixed to 1/2/4 with respect to SCSs of 15/30/60 kHz, respectively. For example, in FR1, the number of S-SSBs transmitted within a time period in which the S-SSB is transmitted and received may be one for SCS=15 kHz, may be two for SCS=30 kHz, and may be four for SCS=60 kHz.

For example, due to 1 ms-sort restrictions with respect to a subframe period, symbol durations within the subframe may not be the same. For example, when the S-SSB is transmitted through the subframe, symbols within the S-SSB may have different symbol durations depending on the position of a subframe boundary within an S-SSB period. Accordingly, for example, blind decoding with respect to the S-SSB may be complicated.

For example, in order to detect the S-SSB and/or to make decoding latency as short as possible, all S-SSBs may be consecutively transmitted in the time domain. For example, all SSBs may be transmitted within a frame period not to cross a frame boundary. For example, PSBCH content may not be changed within an S-SSB period, and thus a receiver may benefit from coupling performance.

For example, the S-SSB may be transmitted within a slot. For example, transmission of the S-SSB across the slot may not be allowed. For example, it may not be allowed to map the S-SSB beyond a slot boundary and the S-SSB may only be mapped within only slot.

For example, all S-SSBs in an S-SSB period may be consecutively transmitted in a frame.

PSBCH

For example, the position of an S-SSB on the time domain may be identified according to a frame number of a frame and a slot index in the frame. For example, this information (e.g., frame index information and/or slot index information) may be carried by a PSBCH such that a UE receives an S-SSB and recognizes the position of a slot for carrying the S-SSB on the time domain.

For example, in the case of an SCS greater than 15 kHz, a plurality of S-SSBs may be consecutively transmitted in a frame for each period. For example, in this case, a frame number of all PSBCH payloads may not be changed in a period. For example, one or more MSB of a slot index may or may not be changed while one or more LSB are changed depending on the position of a first S-SSB in a frame. For example, when the number of S-SSBs in a period is N (N being a natural number) and a slot number (slot index) for transmitting a first S-SSB is an integer multiple of N, only a log 2(N) LSB bit of the slot index may be changed according to an order of S-SSBs in the period. This, for example, may enable a PSBCH decoder to achieve decoding performance improvement through coupling gain.

For example, the number of S-SSBs for 30 kHz/60 kHz/120 kHz may be 2/4/8, and the number of LSB bits may be determined as 3. Thus, for example, 3 LSB of a slot index may be carried by a DM-RS sequence (e.g., a PSBCH DM-RS sequence), and the other bits of the slot index may be included in a PSBCH (content). In the present example, for example, a first S-SSB may not be transmitted in a slot number that is not an integer multiple of N, but a receiver may perform coupling using a more complicated method due to increased hypotheses with respect to a decoding case.

In addition, for example, a PSBCH may carry a slot structure indicating a time division duplex (TDD) slot configuration. For example, a candidate slot/symbol for SL transmission may be known to the UE using the TDD slot configuration. For example, other fields such as a time/frequency position and/or an SCS of a BWP (for SL transmission) may be preconfigured via higher layer signaling.

For example, a PSBCH payload may include one or more of at least the information below:

Slot structure

Frame number (frame index)

Slot index (MSB)

For example, a PSBCH DM-RS may include at least the information below.

Slot index (LSB)

For example, a PSBCH DM-RS may carry an LSB part of a slot index and may be based on an initialization value for generating/acquiring a (PSBCH) DM-RS sequence. That is, for example, an LSB part of a slot index may be used as the initialization value for generating/acquiring a PSBCH DM-RS sequence.

For example, the SL-SSID and the LSB part of the slot index may be used to generate/acquire the PSBCH DM-RS sequence. For example, the PSBCH DM-RS sequence may be initialized using Formula 1 below. For example, a pseudo-random sequence generator related to generation/acquisition of the PSBCH DM-RS sequence may be initialized using Formula 1 below.

$$C_{init} = 2^{11}(i_{slot} + 1)\left(\left\lfloor \frac{SLSSID}{4} \right\rfloor + 1\right) + \qquad \text{[Formula 1]}$$
$$2^6(i_{slot} + 1) + (SLSSID \bmod 4)$$

$c_{init}$: Sequence initialization value for initialization of sequence.

$i_{slot}$: LSB part of slot index. For example, this means an LSB part of a bit indicating a slot index of a slot in which an S-SSB is transmitted and received.

SLSSID: SL-SSID $\lfloor x \rfloor$: floor (x). Floor operation. Floor and ceiling functions. This means the maximum integer equal to or less than real number x.

mod: Modulo arithmetic or Modulo operation. For example, the Modulo arithmetic or Modulo operation may be an operation for calculating a remainder r by dividing a dividend q with a divisor d. (r=q mod (d))

For example, an LSB part of at least a slot index may be used for the initialization value in generation/acquisition of the PSBCH DM-RS sequence.

For example, a comb-4 pattern may be used to map a PSBCH DM-RS sequence to a physical resource element (PRE) and/or a resource element (RE). For example, the position of the PSBCH DM-RS RE on the frequency domain may be shifted according to a (SL-SSID mod 4) value.

For example, a comb-N pattern (e.g., a comb-N type, N being a natural number, and e.g., N=4) may be used in mapping of the PSBCH DM-RS sequence to the RE, and the PSBCH DM-RS RE may be shifted based on an SL-SSID.

For example, a PSBCH payload may include two types of information.

For example, first information may be a master information block (MIB), may be received from a higher layer signal, and may include information such as a slot structure and a frame number.

For example, second information may be added by a physical layer and may include an (MSB part) of a slot index.

For example, a PSBCH payload may be scrambled and may then be channel-coded. For example, PSBCH scrambling prior to channel coding may be performed by scrambling only an MIB according to pseudo-random sequence c(i) of NR, and the pseudo-random sequence may be initialized according to $C_{init}$=SL-SSID at the beginning of each S-SSB.

As a result, for example, the same scrambling sequence may be used for all S-SSBs in an S-SSB period. For example, Formula 2 below may be used.

$$s(i)=c(i) \qquad \text{[Formula 2]}$$

s(i): S-SSB sequence c(i): pseudo-random sequence

For example, PSBCH scramble after channel coding may be performed by scrambling an entire coded PSBCH payload according to a scrambling sequence, and the scrambling sequence may be initialized according to $C_{init}$=SL-SSID at the beginning of each S-SSB period.

As a result, for example, different scrambling sequences may be used for a coded PSBCH payload of each S-SSB in an S-SSB period. For example, a sequence may be generated/acquired based on an LSB part of a slot index. For example, Formula 3 below may be used.

$$s(i)=c(i+vM) \quad \text{[Formula 3]}$$

s(i): S-SSB sequence
c(i): pseudo-random sequence
v: LSB part of slot index for carrying DM-RS
M: Size of PSBCH payload coded in bit For example, prior to a channel, a scrambling sequence may be initialized according to an SL-SSID at the beginning of an S-SSB.

For example, after channel coding, the scrambling sequence may be initialized according an SL-SSID at the beginning of a period of the S-SSB. For example, the sequence may be generated/acquired based on an LSB part of a slot index and a PSBCH payload size.

For example, in NR, an SSB index and the position of an candidate for transmitting an SSB may be mapped according to 1:1, but the S-SSB may be assumed to be also transmitted at any position within a frame in NR V2X.

For example, a plurality of slot indexes for transmitting a specific S-SSB index in a frame may be determined, and the UE may know an S-SSB index when detecting a slot index.

For example, the maximum number of available candidate S-SSBs for each SCS may be $L_{max}$ (i.e., the maximum number of the position of the SSB candidate for each SCS may be changed). For example, the maximum number of available candidate S-SSBs may be one in the case of SCS=15 kHz, may be 2 in the case of SCS=30 kHz, may be 4 in the case of SCS=60 kHz, and may be 8 in the case of SCS=120 kHz.

For example, when S-SSBs are sequentially mapped to respective slots within a unit time (e.g., a frame and/or a half frame), if SSB indexes 0 to $L_{max-1}$ are mapped to consecutive slots within a unit time using a localized method, SSB index=mod (slot index, $L_{max}$) (SSB index=(slot index) mod ($L_{max}$)) may be represented. For example, mod may be modulo arithmetic or modulo operation. For example, the Modulo arithmetic or Modulo operation may be an operation for calculating a remainder r by dividing a dividend q with a divisor d. (r=q mod (d))

For example, the UE may (automatically) know an S-SSB index when detecting a slot index. That is, for example, the UE may acquire an S-SSB index of an S-SSB received from a slot index of a lot in which the detected S-SSB is received.

For example, the UE may infer/know a frame boundary from the detected slot index. Simultaneously, for example, the UE may detect an S-SSB index.

For example, when the S-SSB index is used to determine the positions of resources mapped to the index and/or is measured for each S-SSB, the S-SSB index may also be used to report measurement for each index.

Figure 16:
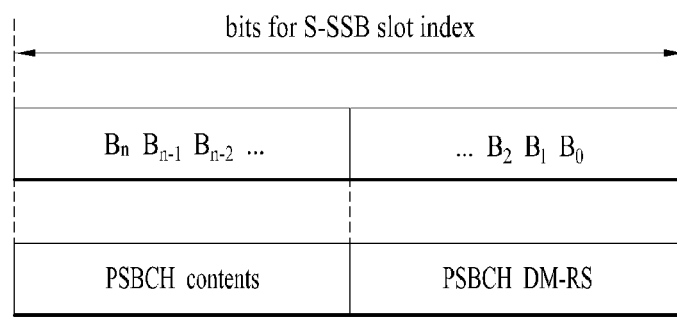
FIG. 16 is a diagram showing an S-SSB slot index bit according to various embodiments of the present disclosure.

FIG. 16 is a diagram showing an S-SSB slot index bit according to various embodiments of the present disclosure.

Referring to FIG. 16, for example, an S-SSB may be transmitted and received in a slot included in a period (unit time) configured with a plurality of slots. For example, a bit indicating a slot index of a slot in which the S-SSB is transmitted and received may be configured with $B_n$ $B_{n-1}$ $B_{n-2}$ ... $B_2$ $B_1$ $B_0$. For example, n may be a natural number. For example, n=7, but the embodiments of the present disclosure are not limited thereto. For example, n may be changed according to the maximum number of candidate S-SSBs.

For example, $B_n$ $B_{n-1}$ $B_{n-2}$ as 3 MSB among $B_n$ $B_{n-1}$ $B_{n-2}$ ... $B_2$ ... $B_2$ $B_1$ $B_0$ may be transmitted and received based on PSBCH content. However, 3 MSB may be merely exemplary, but according to various embodiments of the present disclosure, one or more MSB among bits indicating a slot index may be transmitted and received based on PSBCH content.

For example, $B_2$ $B_1$ $B_0$ as 3 LSB among $B_n$ $B_{n-1}$ $B_{n-2}$ ... $B_2$ $B_1$ $B_0$ may be transmitted and received based on a PSBCH DM-RS. However, 3 LSB may be merely exemplary, but according to various embodiments of the present disclosure, one or more LSB indicating a slot index may be transmitted and received based on a PSBCH DM-RS.

Figure 17:
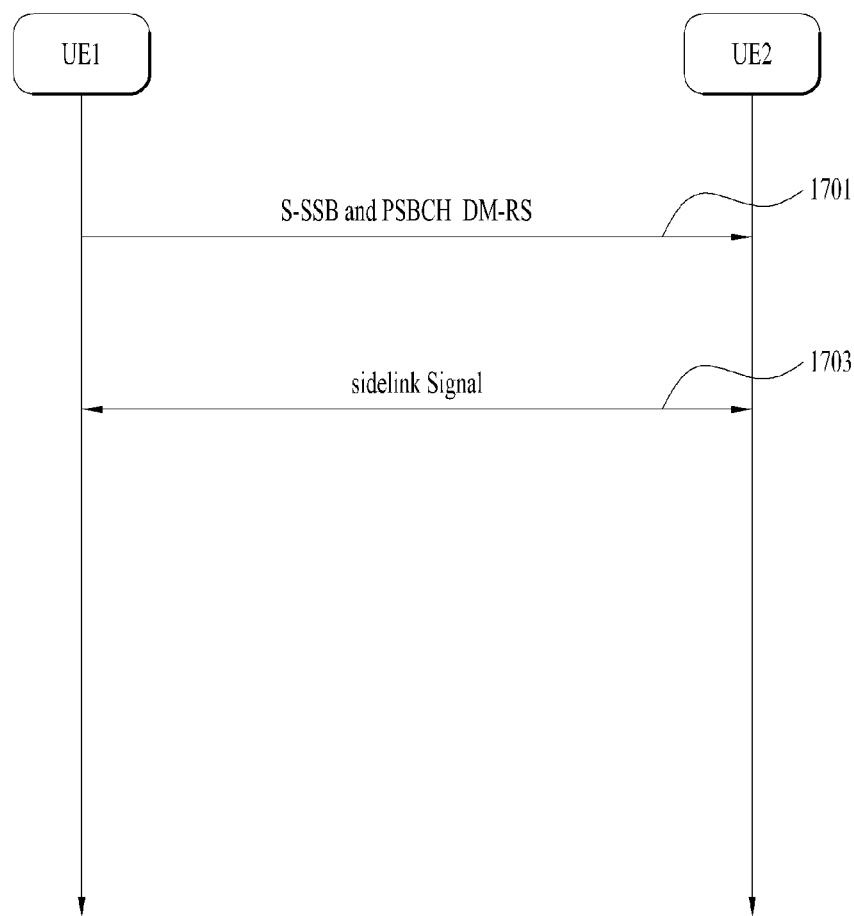
FIG. 17 is a schematic diagram showing a procedure of transmitting and receiving a signal between first and second UEs according to various embodiments of the present disclosure.

FIG. 17 is a schematic diagram showing a procedure of transmitting and receiving a signal between first and second UEs according to various embodiments of the present disclosure.

Figure 18:
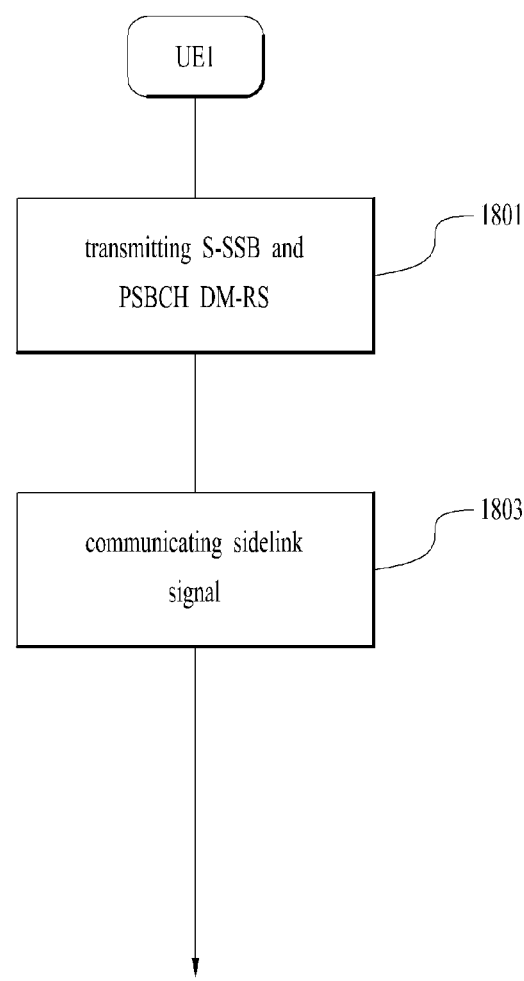
FIG. 18 is a flowchart showing an operating method of a first UE according to various embodiments of the present disclosure.

FIG. 18 is a flowchart showing an operating method of a first UE according to various embodiments of the present disclosure.

Figure 19:
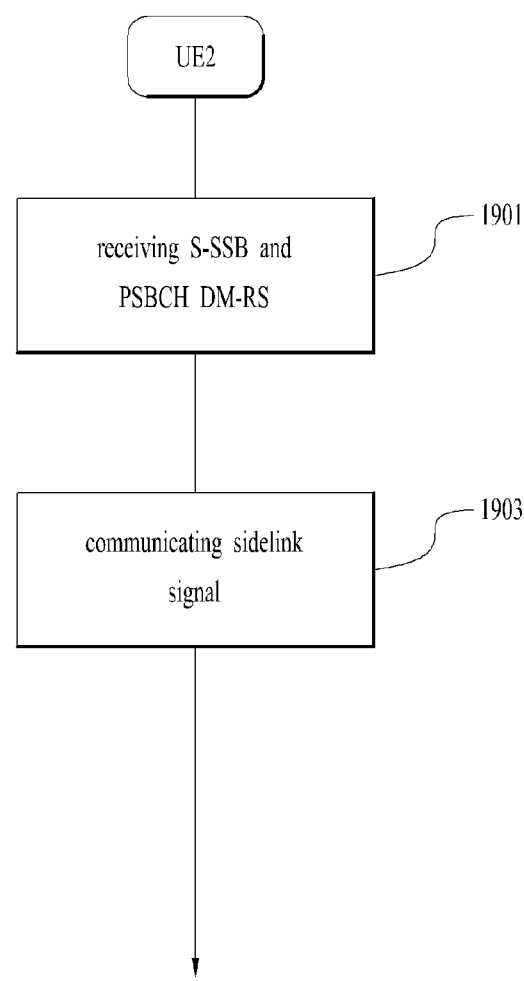
FIG. 19 is a flowchart showing an operating method of a second UE according to various embodiments of the present disclosure.

FIG. 19 is a flowchart showing an operating method of a second UE according to various embodiments of the present disclosure.

Referring to FIGS. 17 to 19, in operations 1701, 1801, and 1901 according to an exemplary embodiment, the first UE may transmit and receive (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for a PSBCH and the second UE may receive the same.

In operations 1703, 1803, and 1903 according to an exemplary embodiment, sidelink signal communication may be performed between the first and second UEs. For example, the first UE (and/or the second UE) may select a sidelink resource for transmitting a sidelink signal based on one or more preconfigured resource pools and may transmit the sidelink signal based on the selected sidelink resource, and the second UE (and/or the first UE) may receive the same.

For example, the S-SSB may be transmitted and received in a slot included in a period including a plurality of slots for transmitting the S-SSB.

For example, one or more most significant bits (MSB) among a plurality of bits indicating a slot index of a slot in which the S-SSB is transmitted and received may be transmitted and received based on a PSBCH.

For example, one or more least significant bits (LSB) among a plurality of bits indicating a slot index of a slot in which the S-SSB is transmitted and received may be transmitted and received based on a PSBCH DM-RS.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure 4.1. Exemplary Configurations of Devices to which Various Embodiments of the Present Disclosure are Applied FIG. 20 is a diagram illustrating devices that implement various embodiments of the present disclosure.

Figure 20:
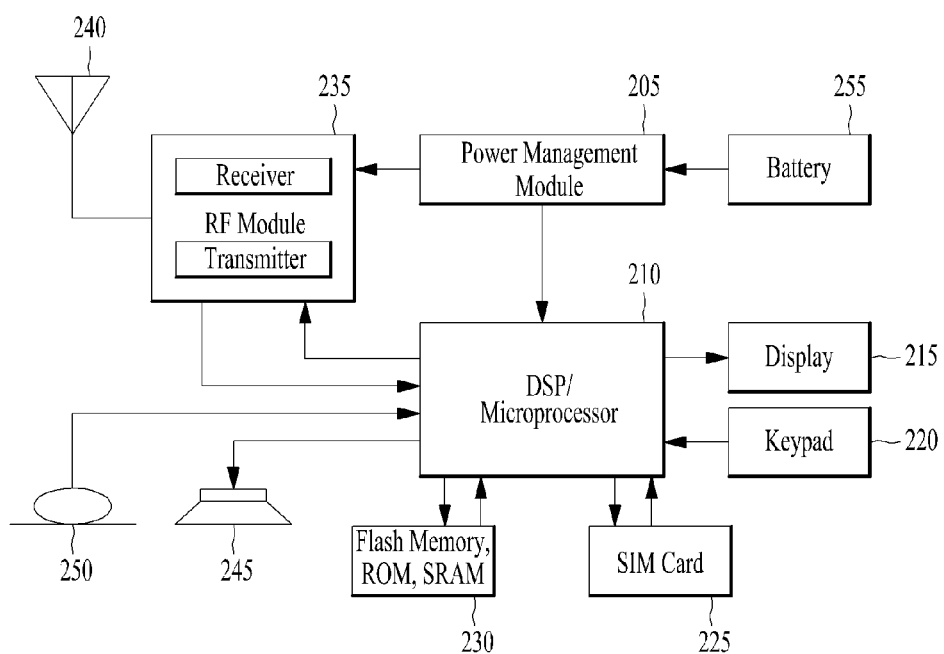
FIG. 20 is a diagram illustrating devices that implement various embodiments of the present disclosure.

The devices illustrated in FIG. 20 may be a UE and/or a BS (e.g., eNB or gNB) adapted to perform the afore-described mechanisms, or any devices performing the same operation.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

A communication device included in the UE or the BS may be configured to include the at least one processor and the at least one memory. The communication device may be configured to include the at least one transceiver, or may be configured not to include the at least one transceiver but to be connected to the at least one transceiver.

A more specific operation of a processor included in a BS and/or a UE according to various embodiments of the present disclosure may be described and performed based on the afore-described clause 1 to clause 3.

Unless contradicting with each other, various embodiments of the present disclosure may be implemented in combination. For example, the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
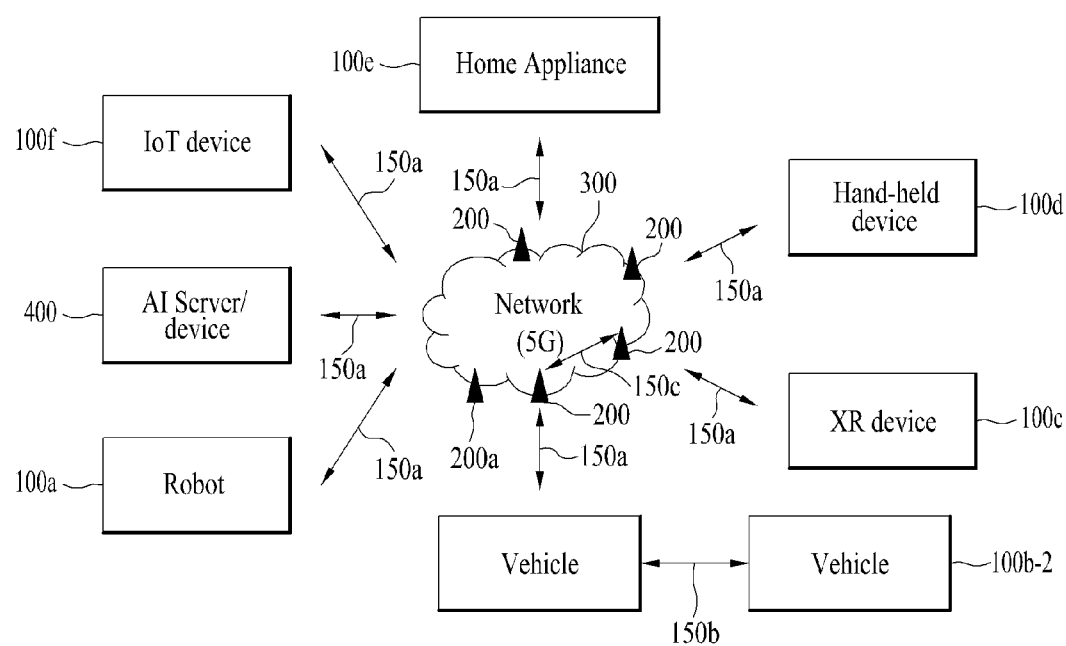
FIG. 21 illustrates an exemplary communication system to which various embodiments of the present disclosure are applied.

FIG. 21 illustrates an exemplary communication system to which various embodiments of the present disclosure are applied.

Referring to FIG. 21, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 22:
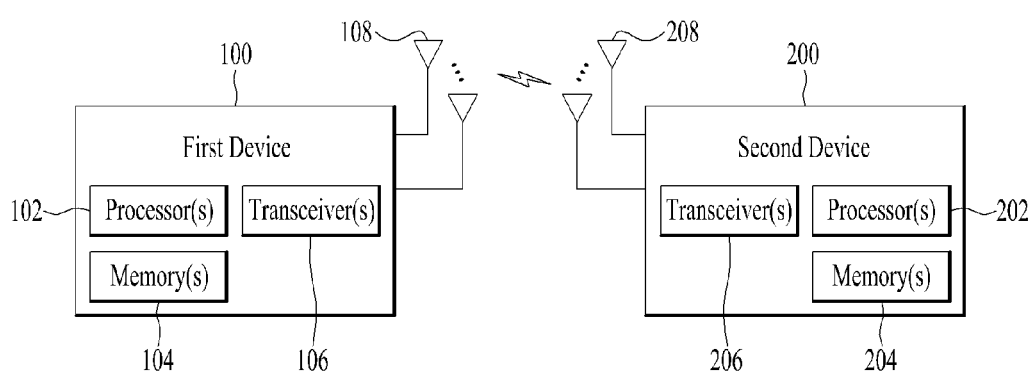
FIG. 22 illustrates exemplary wireless devices to which various embodiments of the present disclosure are applicable.

4.2.1 Example of Wireless Devices to which Various Embodiments of the Present Disclosure are Applied FIG. 22 illustrates exemplary wireless devices to which various embodiments of the present disclosure are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

4.2.2. Example of Signal Processing Circuit According to Various Embodiments of the Present Disclosure FIG. 23 is a diagram showing an example of a signal processing circuit according to various embodiments of the present disclosure.

Figure 23:
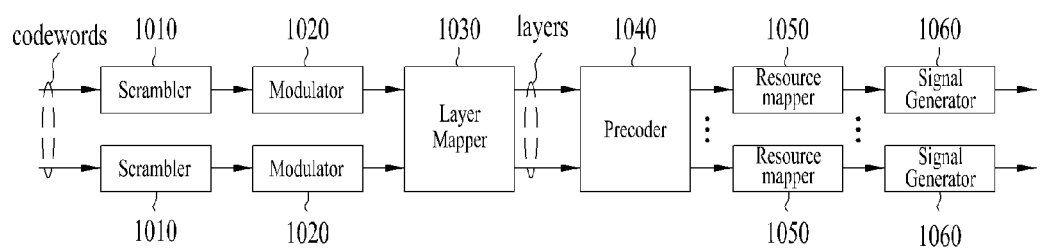
FIG. 23 is a diagram showing an example of a signal processing circuit according to various embodiments of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
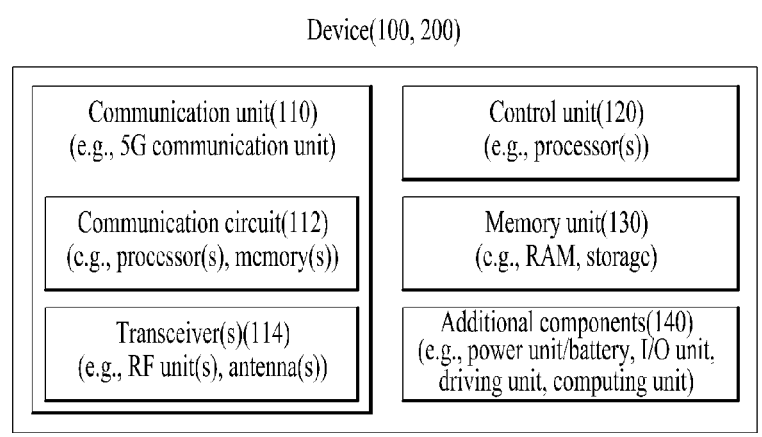
FIG. 24 illustrates other exemplary wireless devices to which various embodiments of the present disclosure are applied.

4.2.3. Example of Using Wireless Devices to which Various Embodiments of the Present Disclosure are Applied FIG. 24 illustrates other exemplary wireless devices to which various embodiments of the present disclosure are applied. The wireless devices may be implemented in various forms according to a use case/service (see FIG. 21).

Referring to FIG. 24, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
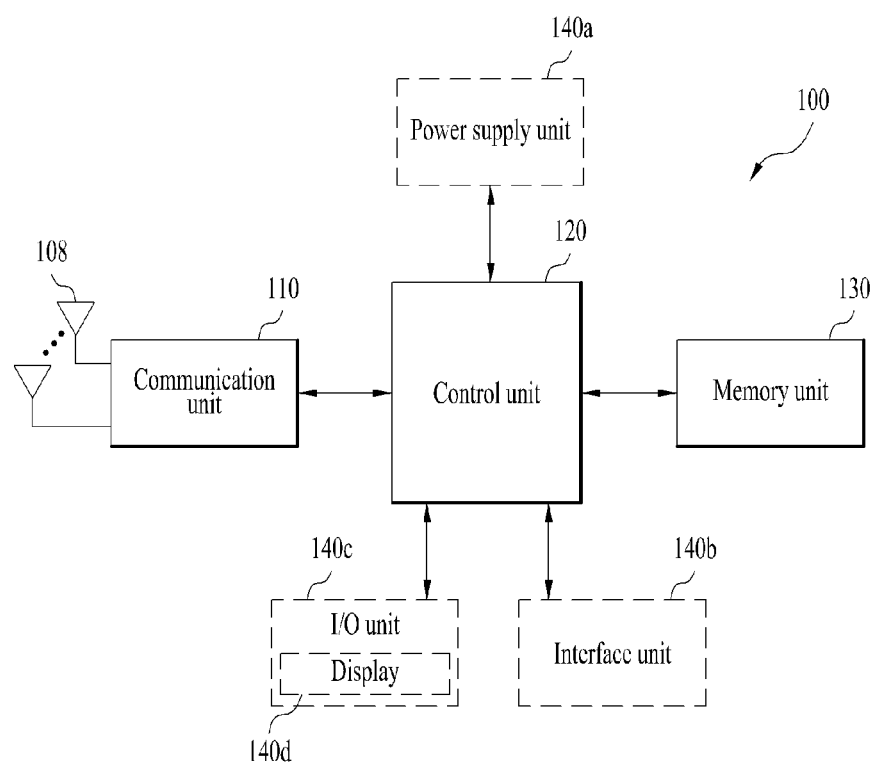
FIG. 25 illustrates an exemplary portable device to which various embodiments of the present disclosure are applied.

4.2.4. Example of Portable Device to which Various Embodiments of the Present Disclosure are Applied FIG. 25 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 26:
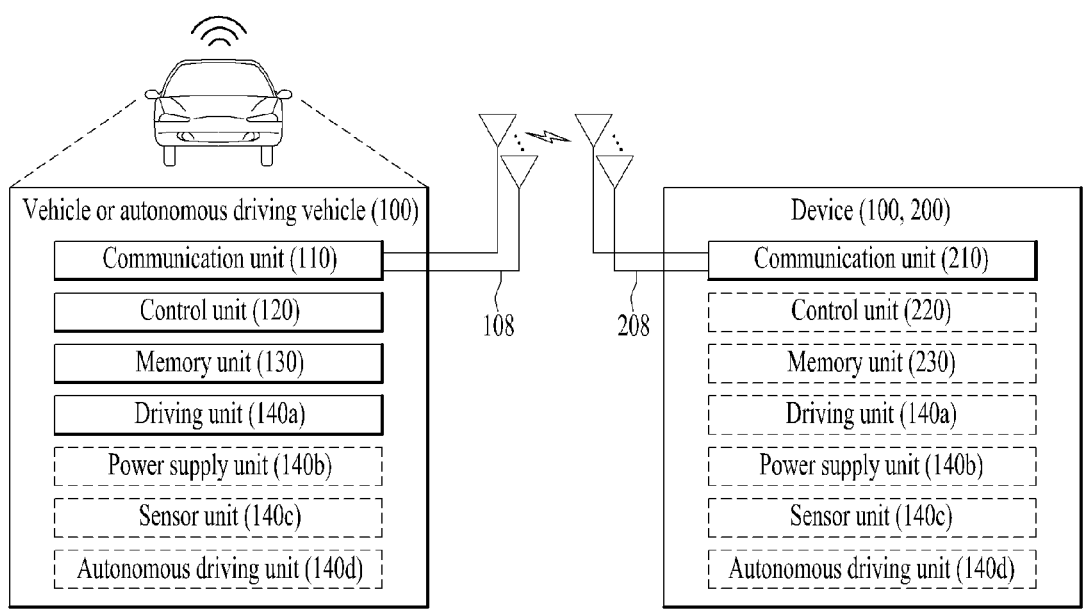
FIG. 26 illustrates an exemplary vehicle or autonomous driving vehicle to which various embodiments of the present disclosure.

4.2.4. Example of Vehicle or Autonomous Driving Vehicle to which Various Embodiments of the Present Disclosure FIG. 26 illustrates an exemplary vehicle or autonomous driving vehicle to which various embodiments of the present disclosure. The vehicle or autonomous driving vehicle may be implemented as a mobile robot, a car, a train, a manned/ unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 27:
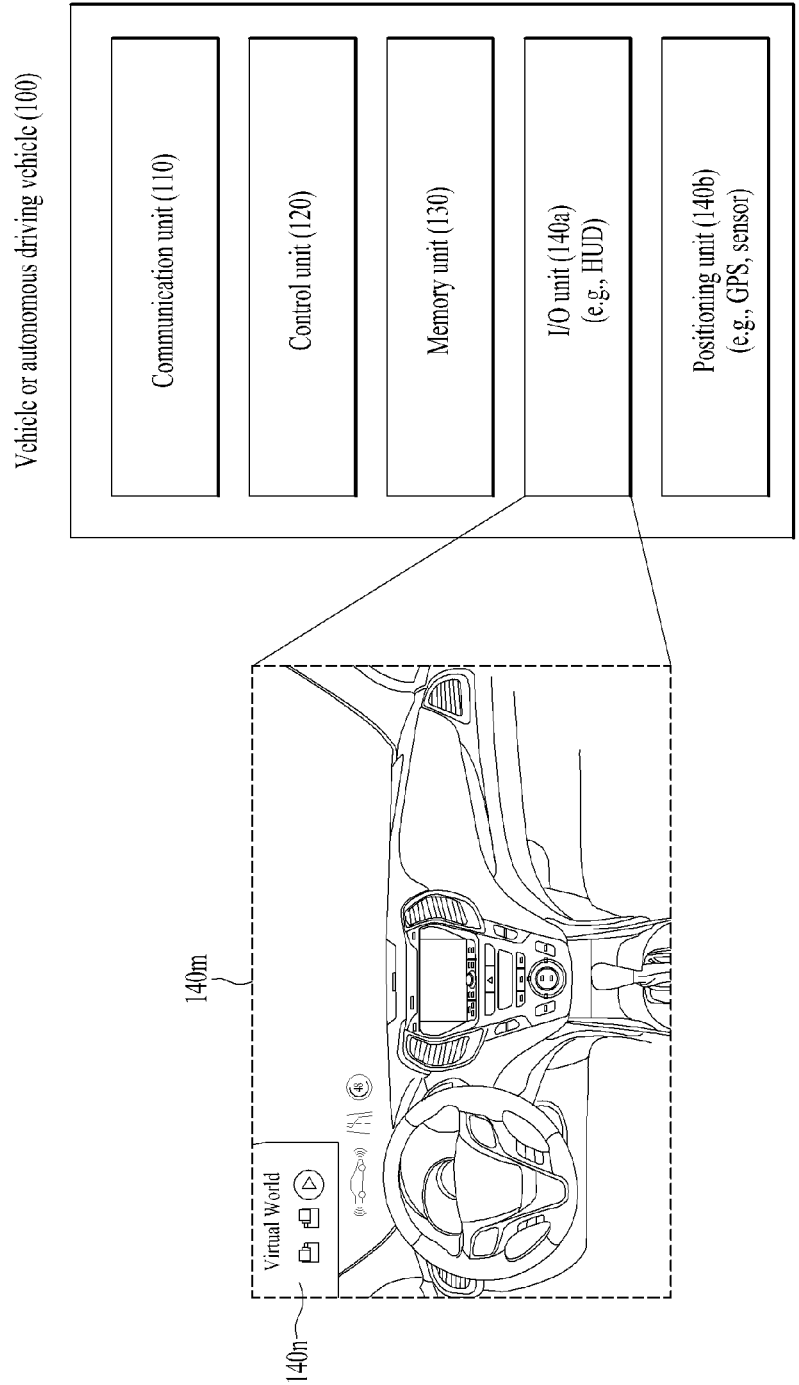
FIG. 27 illustrates an exemplary vehicle to which various embodiments of the present disclosure are applied.

4.2.5. Example of AR/VR and Vehicle to which Various Embodiments of the Present Disclosure FIG. 27 illustrates an exemplary vehicle to which various embodiments of the present disclosure are applied. The vehicle may be implemented as a transportation means, a train, an aircraft, a ship, or the like.

Referring to FIG. 27, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 24.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Figure 28:
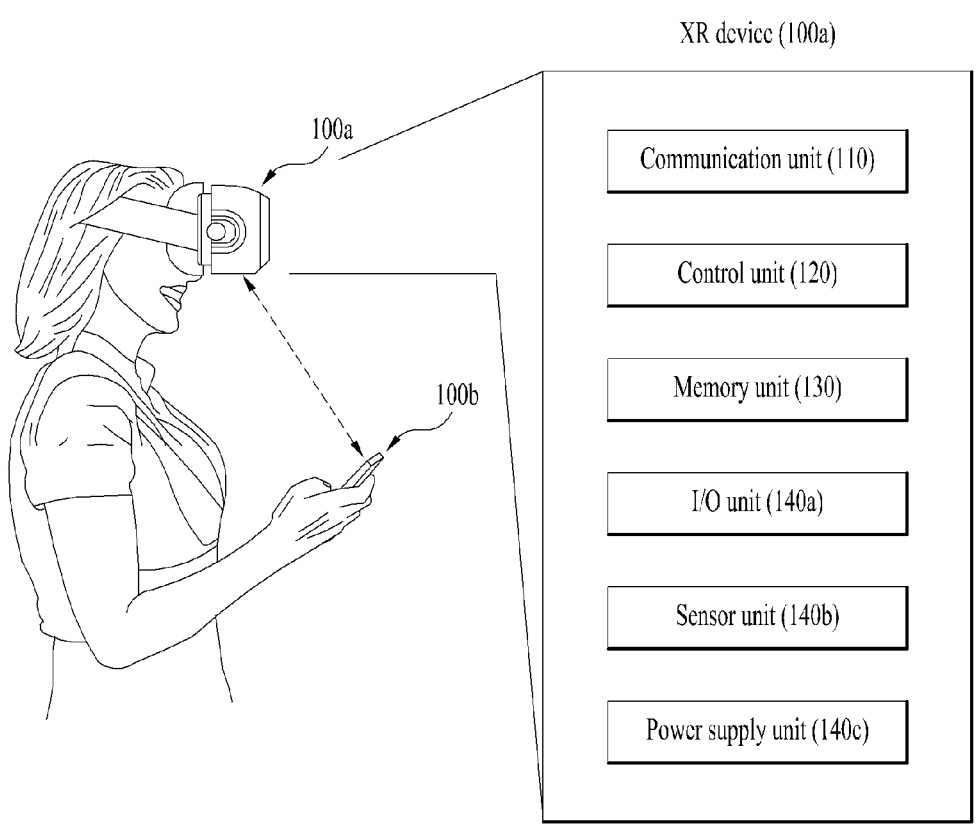
FIG. 28 is a diagram showing an example of an XR device according to various embodiments of the present disclosure.

4.2.7. Example of XR Device According to Various Embodiments of the Present Disclosure FIG. 28 is a diagram showing an example of an XR device according to various embodiments of the present disclosure. The XR device may be implemented as a HMD, a head-up display (HUD) included in a vehicle, a television, a smartphone, a computer, a wearable device, a home appliance, a digital signage, a vehicle, or a robot.

Referring to FIG. 28, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 24, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Figure 29:
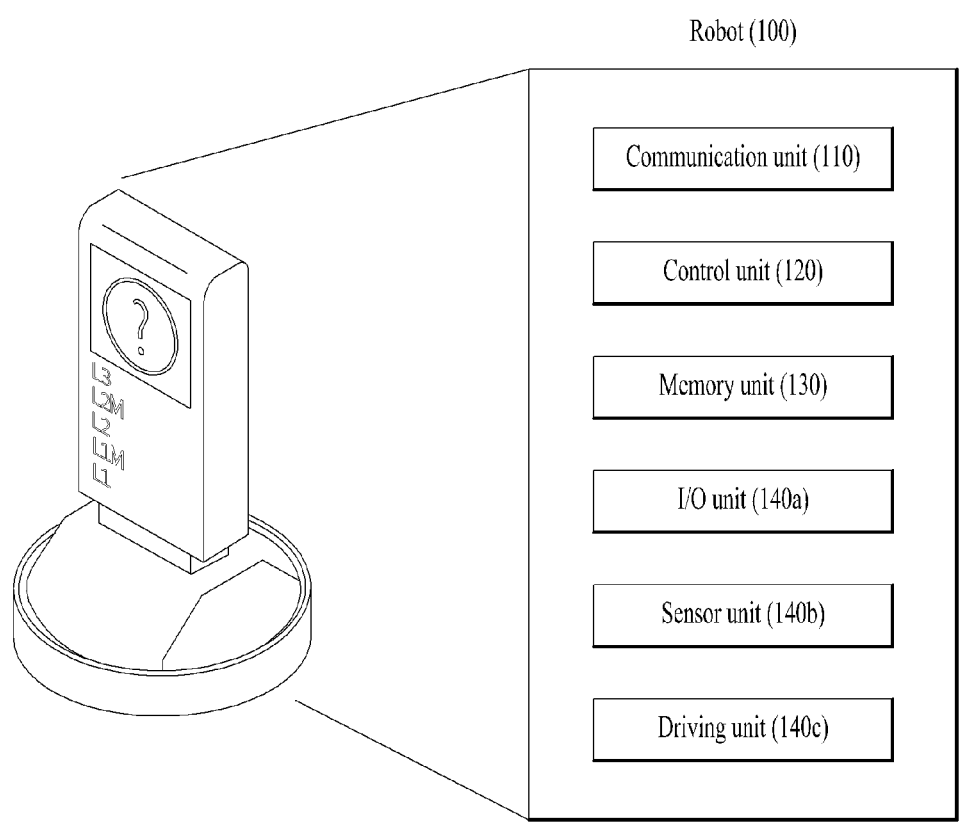
FIG. 29 is a diagram showing an example of a robot according to various embodiments of the present disclosure

4.2.8. Example of Robot According to Various Embodiments of the Present Disclosure FIG. 29 is a diagram showing an example of a robot according to various embodiments of the present disclosure. The robot may be classified into industrial, medical, home, and military robots depending on the purpose or field of use.

Referring to FIG. 29, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 24, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Figure 30:
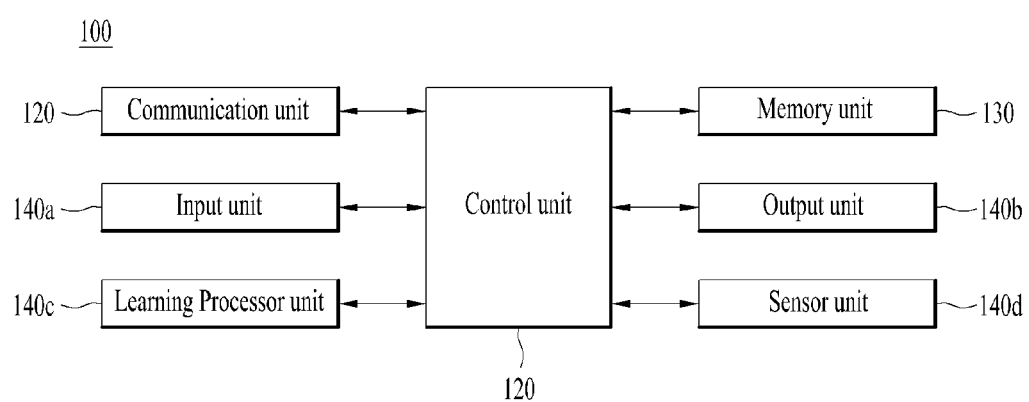
FIG. 30 is a diagram showing an example of an AI device according to various embodiments of the present disclosure.

4.2.9. Example of AI to which Various Embodiments of the Present Disclosure are Applicable FIG. 30 is a diagram showing an example of an AI device according to various embodiments of the present disclosure. The AI device may be implemented as a fixed device or a mobile device, such as a TV, a projector, a smartphone, a PC, a notebook computer, a digital broadcasting UE, a tablet PC, a wearable device, a set-top box (STB), a radio, a washing machine, a refrigerator, a digital signage, a robot, or a vehicle.

Referring to FIG. 30, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 24, respectively.

The communication unit 110 may transmit and receive wired/radio signals (e.g., sensor information, user input, learning models, or control signals) to and from external devices such as other AI devices (e.g., 100x, 200, or 400 of FIG. 21) or an AI server (e.g., 400 of FIG. 21) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 21). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 21). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

A wireless communication technology for implementing various embodiments of the present disclosure may include Narrowband Internet of Things (NB-IoT) for low power communication as well as LTE, NR, and 6G. In this case, for example, the NB-IoT technology may be an example of a Low Power Wide Area Network (LPWAN) technology and may be implemented in standards such as LTE category (Cat) NB1 and/or LTE Cat NB2, and is not limited to the above-described name Additionally or alternatively, the wireless communication technology implemented in a wireless device according to various embodiments of the present disclosure may perform communication based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless device according to various embodiments of the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) related to small/low-power digital communication based on various standards such as IEEE 802.15.4 and may be called various terms.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL AVAILABILITY

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
   transmitting (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH;
   selecting a sidelink resource for transmitting a sidelink signal based on one or more preconfigured resource pools after transmitting the S-SSB; and
   transmitting the sidelink signal based on the sidelink resource,
   wherein:
   the S-SSB is transmitted in a slot included in a period including a plurality of slots for transmission of the S-SSB;
   one or more most significant bits (MSB) among a plurality of bits representing a slot index of the slot are transmitted based on the PSBCH; and
   one or more least significant bits (LSB) among the plurality of bits are transmitted based on the PSBCH DM-RS.

2. The method of claim 1, wherein a sequence generator for generating a sequence included in the PSBCH DM-RS is initialized based on a sidelink-service set identifier (SL-SSID) and the LSB.

3. The method of claim 1, wherein the PSBCH is generated based on that (i) a master information block (MIB) is scrambled according to a first scrambling sequence for scrambling of the MIB and (ii) a PSBCH payload including the scrambled MIB is scrambled according to a second scrambling sequence for the PSBCH payload.

4. The method of claim 3, wherein:
   the first scrambling sequence is initialized based on an SL-SSID at beginning of the S-SSB; and
   the second scrambling sequence is initialized based on the SL-SSID at beginning of the period.

5. The method of claim 1, wherein:
   a plurality of resource elements (REs) with the PSBCH DM-RS mapped thereto are configured with 4-comb on a frequency domain; and
   positions of the plurality of REs on the frequency domain are shifted based on the SL-SSID.

6. The method of claim 1, wherein:
   an S-SSB index of the S-SSB is equal to a remainder obtained by dividing the slot index with $L_{max}$;
   the $L_{max}$ is a maximum number of candidate S-SSBs to be transmitted by the S-SSB, determined according to subcarrier spacing (SCS);
   the $L_{max}$ is 1 based on the SCS being 15 kHz;
   the $L_{max}$ is 2 based on the SCS being 30 kHz;
   the $L_{max}$ is 4 based on the SCS being 60 kHz; and
   the $L_{max}$ is 8 based on the SCS being 120 KHz.

7. The method of claim 1, wherein the PSBCH includes information related to time division duplex (TDD) slot configuration (TDD slot configuration) for a position of a candidate time resource for transmitting a sidelink data channel.

8. An apparatus operating in a wireless communication system, the apparatus comprising:
   a memory; and
   one or more processors connected to the memory,
   wherein:
   the one or more processors transmit (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, selects a sidelink resource for transmitting a sidelink signal based on one or more preconfigured resource pools after transmitting the S-SSB, and transmits the sidelink signal based on the sidelink resource;

the S-SSB is transmitted in a slot included in a period including a plurality of slots for transmission of the S-SSB;

one or more most significant bits (MSB) among a plurality of bits representing a slot index of the slot are transmitted based on the PSBCH; and one or more least significant bits (LSB) among the plurality of bits are transmitted based on the PSBCH DM-RS.

9. The apparatus of claim 8, wherein a sequence generator for generating a sequence included in the PSBCH DM-RS is initialized based on a sidelink-service set identifier (SL-SSID) and the LSB.

10. The apparatus of claim 8, wherein the PSBCH is generated based on that (i) a master information block (MIB) is scrambled according to a first scrambling sequence for scrambling of the MIB and (ii) a PSBCH payload including the scrambled MIB is scrambled according to a second scrambling sequence for the PSBCH payload.

11. The apparatus of claim 8, wherein the apparatus communicates with one or more of a mobile user equipment (UE), a network, and an autonomous driving vehicle other than a vehicle including the apparatus.

12. A method performed by a user equipment (UE) in a wireless communication system, the method comprising:

receiving (i) a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH; and receiving a sidelink signal included in one or more preconfigured resource pools based on a sidelink resource for receiving the sidelink signal after transmitting the S-SSB, wherein:

the S-SSB is received in a slot included in a period including a plurality of slots for transmission of the S-SSB;

one or more most significant bits (MSB) among a plurality of bits representing a slot index of the slot are received based on the PSBCH; and one or more least significant bits (LSB) among the plurality of bits are received based on the PSBCH DM-RS.

13. An apparatus operating in a wireless communication system, the apparatus comprising:

a memory; and one or more processors connected to the memory, the one or more processors receive a sidelink-synchronization signal block (S-SSB) including a sidelink-primary synchronization signal (S-PSS), a sidelink-secondary synchronization signal (S-SSS), and a physical sidelink broadcast channel (PSBCH) and (ii) a PSBCH demodulation-reference signal (DM-RS) for the PSBCH, and receive a sidelink signal included in one or more preconfigured resource pools based on a sidelink resource for receiving the sidelink signal after transmitting the S-SSB, wherein:

the S-SSB is received in a slot included in a period including a plurality of slots for transmission of the S-SSB;

one or more most significant bits (MSB) among a plurality of bits representing a slot index of the slot are received based on the PSBCH; and one or more least significant bits (LSB) among the plurality of bits are received based on the PSBCH DM-RS.

* * * * *